(12) United States Patent
Jacobsen et al.

(10) Patent No.: US 8,124,698 B2
(45) Date of Patent: Feb. 28, 2012

(54) DIENE POLYMERISATION

(75) Inventors: Grant Berent Jacobsen, Sandringham (AU); Juan Jose Chirinos-Colina, Edo Zuila (VE); Vernon Charles Gibson, London (GB)

(73) Assignee: Ineos Europe Limited, Hampshire (GB)

( * ) Notice: Subject to any disclaimer, the term of this patent is extended or adjusted under 35 U.S.C. 154(b) by 342 days.

(21) Appl. No.: 11/989,507

(22) PCT Filed: Jul. 27, 2006

(86) PCT No.: PCT/GB2006/002832
§ 371 (c)(1),
(2), (4) Date: Sep. 9, 2009

(87) PCT Pub. No.: WO2007/015074
PCT Pub. Date: Feb. 8, 2007

(65) Prior Publication Data
US 2010/0022724 A1    Jan. 28, 2010

(30) Foreign Application Priority Data
Aug. 2, 2005    (EP) .................................. 05254833

(51) Int. Cl.
*C08F 4/06* (2006.01)
*C08F 4/26* (2006.01)
*C08F 4/24* (2006.01)
*C08F 4/70* (2006.01)
*C08F 4/80* (2006.01)
*C08F 136/00* (2006.01)
*B01J 23/00* (2006.01)

(52) U.S. Cl. ........ 526/117; 526/101; 526/103; 526/104; 526/113; 526/171; 526/335; 502/313; 502/315; 502/316

(58) Field of Classification Search ................ 502/228, 502/305, 167, 200
See application file for complete search history.

(56) References Cited

U.S. PATENT DOCUMENTS
3,247,175 A * 4/1966 Van Volkenburgh et al. . 526/115
(Continued)

FOREIGN PATENT DOCUMENTS
WO      WO 99/46302       *   8/1999
WO      WO 2004083263 A1  *   9/2004
WO      WO 2006/054048 A1     5/2006

*Primary Examiner* — David W Wu
*Assistant Examiner* — Elizabeth Eng
(74) *Attorney, Agent, or Firm* — Nixon & Vanderhye

(57) ABSTRACT

Process for producing homopolymers or copolymers of conjugated dienes by contacting monomeric material having at least one conjugated diene with a catalyst system including two or more different transition metal compounds and optionally one or more activators. Preferred transition metal compounds are based on cobalt and chromium, especially complexes thereof having benzimidazole ligands.

15 Claims, No Drawings

U.S. PATENT DOCUMENTS 3,560,405 A * 2/1971 Zelinski et al. ............... 502/113
5,731,381 A    3/1998 Apecetche et al.
2003/0144432 A1 7/2003 Llinas et al.
2004/0077489 A1 4/2004 Kimberley et al.

* cited by examiner

DIENE POLYMERISATION

This application is the U.S. National Phase of International Application PCT/GB2006/002832, filed 27 Jul. 2006, which designated the U.S. PCT/GB2006/002832 claims priority to European Application No. 05254833.6 filed 2 Aug. 2005. The entire content of these applications are incorporated herein by reference.

The present invention relates to diene polymers and copolymers and to a process for making such polymers and copolymers using certain transition metal-based catalysts.

WO 2004/083263 published in the name of BP Chemicals on 30 Sep. 2004 relates to a transition metal complex polymerisation catalyst and to a process for the polymerisation and copolymerisation of 1-olefins, cyclo-olefins or dienes, comprising contacting the monomer with the catalyst. Monomers disclosed therein as suitable for use in making homopolymers are ethylene, propylene, butene, hexene, styrene or conjugated or non-conjugated dienes. Preferred monomers are ethylene and propylene. Monomers disclosed as suitable for making copolymers are ethylene, propylene, 1-butene, 1-hexene, 4-methylpentene-1,1-octene, norbornene, substituted norbornenes, dienes, eg butadiene, ethylidene norbornene, methyl methacrylate, methyl acrylate, butyl acrylate, acrylonitrile, vinyl acetate, vinyl chloride, and styrene.

There is a commercial need for polydienes having specified ratios of cis/trans polymerised units in the polymer. This need can generally be met for example by polymerising butadiene to form separate polymers having a known cis and trans contents and blending these polymers to produce the desired product. However, blending polymers is expensive in terms of energy usage, equipment costs and time and can be technically difficult especially when the polymers have high molecular weight, poor compatibility or sensitivity to mechanical blending. There is thus a commercial need to provide polydienes having a predefined content of cis and trans units without the need for post reactor mechanical blending of the component polydienes.

An object of the present invention is to provide a process for producing polymers of conjugated dienes, for example butadiene or isoprene. A further object is to provide polymers of conjugated dienes wherein the polymer has a controllable level of cis-polydiene and trans-polydiene without the need for post-reactor blending.

Accordingly the present invention provides a process for producing homopolymers or copolymers of conjugated dienes comprising contacting monomeric material comprising at least one conjugated diene with a catalyst system comprising two or more different transition metal compounds and optionally one or more activators.

Surprisingly it has been found that by using two or more different transition metal catalysts it is possible to produce polydienes having a desirable range of properties. Without wishing to limit the generality of this statement, it has been found, for example that varying the ratio of two different transition metal compounds in the catalyst composition leads to useful variations in the microstructure of the produced diene polymer. Thus for example by changing the mole ratios of Co:Cr in a cobalt/chromium mixed catalyst system it has been found that useful variations in the cis:trans content of the produced polydiene can be achieved.

The monomeric material comprises at least one diene and optionally one or more 1-olefins. Dienes employed in the polymerisation process of the present invention preferably have the general formula $R^1R^2C=CR^3CR^4=CR^5CR^6$ wherein $R^1$ to $R^6$ are independently selected from hydrogen, halogen, alkyl, cycloalkyl, aryl, aralkyl and alkaryl. For example they can be chloro, methyl, ethyl, n-propyl, isopropyl, or single or mixtures of isomeric forms of pentyl, hexyl, octyl, decyl; or aryl groups selected from, for example, phenyl 2 chloro-phenyl, o-biphenyl, naphthyl, phenanthryl and anthryl; or alkaryl groups selected from, for example, phenylmethyl, phenylethyl, phenyl-n-propyl, naphthylmethyl; or aralkyl groups, for example, tolyl, xylyl, mesityl or 2-methylnaphthyl. However, when the diene is too heavily substituted by bulky groups it may be difficult or impossible to cause the diene to polymerise due to steric hinderance. The diene employed preferably has the general formula $R^1H-C=CR^3-CH=CH_2$ wherein $R^1$ and $R^3$ are independently selected from hydrogen, chlorine and a $C_1$ to $C_{10}$ hydrocarbyl group. Preferred dienes are 1,3-butadiene, 2-methyl-1,3-butadiene (isoprene), and 2-chloro-1,3-butadiene (chloroprene).

The monomeric material used in the polymerisation process of the present invention can contain one or more 1-olefins. Suitable 1-olefins are any which are capable of being copolymerised with conjugated dienes. Examples of suitable 1-olefins are ethylene, propylene, butene, hexene, 4-methylpentene-1,1-octene, norbornene, substituted norbornenes and styrene.

Thus a further embodiment of the present invention provides a process for making a copolymer of one or more conjugated dienes and one or more 1-olefins comprising contacting the monomeric material with a catalyst system comprising two or more different transition metal compounds and optionally one or more activators.

Preferably the copolymers prepared by the process comprise polymerised units of a conjugated diene and up to 99.0 moles percent of a $C_1$ to $C_{20}$ 1-olefin. For example the copolymers can have a molar ratio of diene:1-olefin in the range 2:98 to 98:2, preferably 5:95 to 95:5.

The polymerisation catalyst employed in the present invention comprises two or more different transition metal compounds by which is meant that either the transition metals can be different, or the transition metals can be the same but the transition metal compounds differ in the anion or ligand associated with the metal, or the compounds can be different in both these respects. Preferably two or more different transition metals are used. For example a first transition metal selected from Cr, Mo and W, and a second transition metal selected from Fe, Co, and Ni. In a preferred embodiment of the present invention a single activator is employed.

The amount of each of these transition metal compounds employed in the process of the present invention is preferably such that the concentration of any one of these compounds is >0.01 moles %, more preferably >0.02 moles % most preferably at least 0.10 moles % based on total moles of transition metal compound employed as catalyst.

The transition metal employed in the transition metal compound is suitably selected from a group 3-10 transition metal or lanthanide or actinide. The transition metal compound can be a simple organic or inorganic compound, for example chloride, bromide, sulphate, acetate and carbonate. Preferably the transition metal compound is selected from a complex containing neutral, monoanionic or dianionic ligands. The ligands can be monodentate, bidentate, tridentate or tetradentate. The ligands preferably comprise at least one N, P, O or S atom. In another preferred embodiment at least one of the transition metal compounds is a metallocene.

Non-limiting examples of such complexes are described in WO 96/23010, WO 97/02298, WO 98/30609, WO 99/50313, WO 98/40374, WO 00/50470, WO 98/42664, WO 99/12981, WO 98/27124, WO 00/47592, WO 01/58966 and our own co-pending applications PCT 02/02247 and PCT 02/02144.

When the one or more transition metal compounds comprise a metallocene this may contain, for example, at least one cyclopentadienyl-based ring ligand. For the purposes of this patent specification the term "metallocene" is defined as containing one or more unsubstituted cyclopentadienyl or substituted cyclopentadienyl moieties in combination with a group 3-6 transition metal, a group 3 main group metal, a lanthanide or an actinide. In one embodiment the metallocene catalyst component is represented by the general formula $(C_p)_m MR_n R'_p$ wherein at least one $C_p$ is an unsubstituted or, preferably, a substituted cyclopentadienyl ring, a substituted or unsubstituted ring system such as an indenyl moiety, a benzindenyl moiety, a fluorenyl moiety or the like, or any other ligand capable of η-5 bonding such as boroles or phospholes; M is a Group 4, 5 or 6 transition metal, a lanthanide or an actinide; R and R' are independently selected halogen, hydrocarbyl group, or hydrocarboxyl groups having 1-20 carbon atoms or combinations thereof; m=1-3, n=0-3, p=0-3, and the sum of m+n+p equals the oxidation state of M, preferably m=2, n=1 and p=1. The Cp can be substituted with a combination of substituents, which can be the same or different. Non limiting examples of substituents include hydrogen or a linear, branched or cyclic alkyl, alkenyl or aryl radical having from 1 to 20 carbon atoms.

In another embodiment the metallocene catalyst component is represented by the formulas:

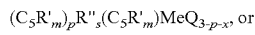

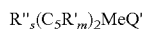

wherein Me is a Group 4, 5 or 6 transition metal, a lanthanide or an actinide; at least one $C_5R'_m$ is a substituted cyclopentadienyl, each R', which can be the same or different is hydrogen, alkyl, alkenyl, aryl, alkylaryl or arylalkyl radical having from 1 to 20 carbon atoms or two carbon atoms joined together to form a part of a substituted or unsubstituted ring or rings having 4 to 20 carbon atoms, R" is one or more of or a combination of a carbon, a germanium, a silicon, a phosphorous or a nitrogen atom containing radical bridging two $(C_5R'_m)$ rings, or bridging one $(C_5R'_m)$ ring to M, when p=0 and x=1 otherwise "x" is always equal to 0, each Q which can be the same or different is an aryl, alkyl, alkenyl, alkylaryl, or arylalkyl radical having from 1 to 20 carbon atoms, halogen, or alkoxides, Q' is an alkylidene radical having from 1-20 carbon atoms, s is 0 or 1 and when s is 0, m is 5 and p is 0, 1 or 2 and when s is 1, m is 4 and p is 1.

Preferred metallocenes are bis(pentamethylcyclopentadienyl) zirconium dichloride, bis(pentamethylcyclopentadienyl) hafnium dichloride, bis(tetramethylcyclopentadienyl) zirconium dichloride, (pentamethylcyclopentadienyl) zirconium trichloride, (tetaamethylcyclopentadienyl)(t-butylamido)(dimethylsilane) titanium dimethyl, and (pentamethylcyclopentadienyl)(cyclopentadienyl) zirconium dichloride.

A preferred class of transition metal complexes are represented generically by the Formula (I):

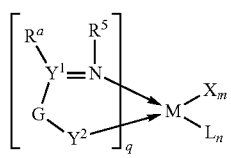

wherein M is Y[II], Y[III], Sc[II], Sc[III], Ti[II], Ti[III], Ti[IV], Zr[II], Zr[III], Zr[IV], Hf[II], Hf[III], Hf[IV], V[II], V[II], V[III], Nb[II], Nb[III], Nb[IV], Nb[V], Ta[II], Ta[III], Ta[IV], Cr[II], Cr[III], Mn[II], Mn[III], Mn[IV], Fe[II], Fe[III], Ru[II], Ru[III], Ru[IV], Co[II], Co[III], Rh[II], Rh[III], Ni[II], Pd[II], X represents an atom or group covalently or ionically bonded to the transition metal M; $Y^1$ is C or P($R^c$); $Y^2$ is —O($R^7$), —O (in which case the bond from O to M is covalent), —C($R^b$)=O, —C($R^b$)=N($R^7$), —P($R^b$)($R^d$)=N($R^7$) or P($R^b$)($R^d$)=O; $R^a$, $R^b$, $R^c$, $R^d$, $R^5$ and $R^7$ are each independently selected from hydrogen, halogen, hydrocarbyl, substituted hydrocarbyl, heterohydrocarbyl, substituted heterohydrocarbyl or SiR'$_3$ where each R' is independently selected from hydrogen, halogen, hydrocarbyl, substituted hydrocarbyl, heterohydrocarbyl and substituted heterohydrocarbyl, and any adjacent ones may be joined together to form a ring; G is either a direct bond between $Y^1$ and $Y^2$, or is a bridging group, which optionally contains a third atom linked to M when q is 1; L is a group datively bound to M; n is from 0 to 5; m is 1 to 3 and q is 1 or 2.

One preferred complex is represented by the general formula (II):

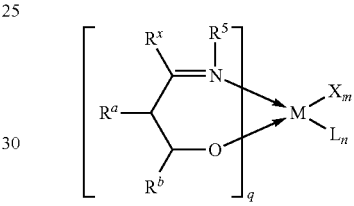

wherein $R^x$ is selected from hydrogen, halogen, hydrocarbyl, substituted hydrocarbyl, heterohydrocarbyl, substituted heterohydrocarbyl or SiR'$_3$ where each R' is independently selected from hydrogen, halogen, hydrocarbyl, substituted hydrocarbyl, heterohydrocarbyl and substituted heterohydrocarbyl, and all other substituents are as defined above. In the complex of Formula (II), M is preferably a Group IV metal, particularly Ti, Zr, a Group VI metal, particularly Cr, or a Group VII metal, particularly Ni, Co, or Pd. Preferably $R^a$ and $R^b$ are joined together to form a phenyl, which is preferably substituted. Preferred substituents are $C_1$-$C_6$ alkyl or $C_6$-$C_{24}$ aryl or aralkyl. In particular, the phenyl group may be substituted at the position adjacent the oxygen linkage with a t-butyl group or an anthracenyl group, which may itself be substituted.

A further preferred complex is that of Formula (III):

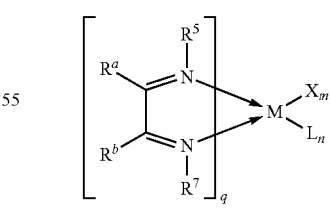

wherein M is Cr[II], Cr[III], Mn[II], Mn[III], Mn[IV], Fe[II], Fe[III], Ru[II], Ru[III], Ru[IV], Co[II], Co[III], Rh[II], Rh[III], Ni[II], Pd[II], Cu[I], Cu[II]; X represents an atom or group covalently or ionically bonded to the transition metal M; $R^a$ and $R^b$ are each independently selected from hydrogen, halogen, hydrocarbyl, substituted hydrocarbyl, heterohydrocarbyl, substituted heterohydrocarbyl or SiR'$_3$ where each R' is independently selected from hydrogen, halogen, hydrocarbyl, substituted hydrocarbyl, heterohydrocarbyl and substituted heterohydrocarbyl, and R$^a$ and R$^b$ may be joined together to form a ring; R$^5$ and R$^7$ are each as defined above; and L is a group datively bound to M; n is from 0 to 5; m is 1 to 3 and q is 1 or 2. Preferably M is Fe, Ni or Pd.

A particularly preferred complex has the following Formula (IV):

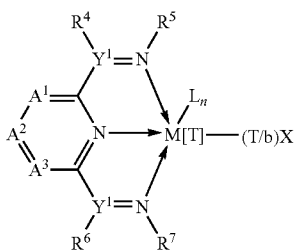

wherein M[T] is Ti[II], Ti[III], Ti[IV], Zr[II], Zr[III], Zr[IV], Hf[II], Hf[III], Hf[IV], V[II], V[III], V[IV], Nb[II], Nb[III], Nb[IV], Nb[V], Ta[II], Ta[III], Ta[IV], Cr[II], Cr[III], Mn[II], Mn[III], Mn[IV], Fe[II], Fe[III], Ru[II], Ru[III], Ru[IV], Co[II], Co[III], Rh[II], Rh[III], Ni[II], Pd[II]; X represents an atom or group covalently or ionically bonded to the transition metal M; T is the oxidation state of the transition metal M and b is the valency of the atom or group X; Y$^1$ is C or P(R$^c$), A$^1$ to A$^3$ are each independently N or P or CR, with the proviso that at least one is CR; R, R$^c$, R$^4$ and R$^6$ are each independently selected from hydrogen, halogen, hydrocarbyl, substituted hydrocarbyl, heterohydrocarbyl, substituted heterohydrocarbyl or SiR'$_3$ where each R' is independently selected from hydrogen, halogen, hydrocarbyl, substituted hydrocarbyl, heterohydrocarbyl and substituted heterohydrocarbyl; and R$^5$ and R$^7$ are each as defined above.

Preferably Y$^1$ is C. Preferably A$^1$ to A$^3$ are each independently CR where each R is as defined above. In alternative preferred embodiments, A$^1$ and A$^3$ are both N and A$^2$ is CR, or one of A$^1$ to A$^3$ is N and the others are independently CR. Examples of such embodiments include the following:

Formula (IVa)

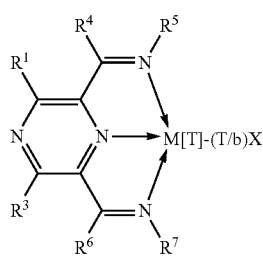

Formula (IVb)

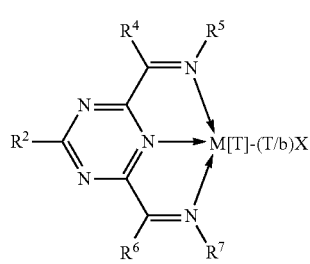

Formula (IVc)

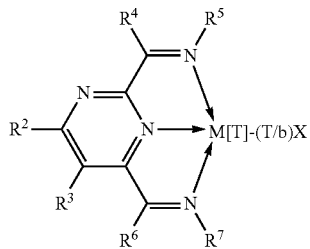

wherein R$^1$, R$^2$ and R$^3$ are each independently H, or C$_1$-C$_{10}$ alkyl, aryl or aralkyl.

Generally in the above Formulae, R$^5$ and R$^7$ are preferably independently selected from substituted or unsubstituted alicyclic, heterocyclic or aromatic groups, for example, phenyl, 1-naphthyl, 2-naphthyl, 2-methylphenyl, 2-ethylphenyl, 2,6-diisopropylphenyl, 2,3-diisopropylphenyl, 2,4-diisopropylphenyl, 2,6-di-n-butylphenyl, 2,6-dimethylphenyl, 2,3-dimethylphenyl, 2,4-dimethylphenyl, 2-t-butylphenyl, 2,6-diphenylphenyl, 2,4,6-trimethylphenyl, 2,6-trifluoromethylphenyl, 4-bromo-2,6-dimethylphenyl, 3,5-dichloro-2,6-diethylphenyl, and 2,6-bis(2,6-dimethylphenyl) phenyl, cyclohexyl, pyrolyl, 2,5 dimethylpyrolyl and pyridinyl.

In a preferred embodiment R$^5$ is represented by the group "P" and R$^7$ is represented by the group "Q" as follows:

Group P

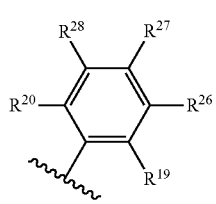

Group Q

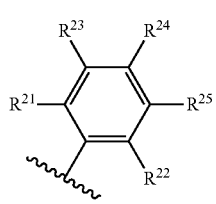

wherein R$^{19}$ to R$^{28}$ are independently selected from hydrogen, halogen, hydrocarbyl, substituted hydrocarbyl, heterohydrocarbyl or substituted heterohydrocarbyl; when any two or more of R$^1$ to R$^4$, R$^6$ and R$^{19}$ to R$^{28}$ are hydrocarbyl, substituted hydrocarbyl, heterohydrocarbyl or substituted heterohydrocarbyl, said two or more can be linked to form one or more cyclic substituents.

Preferably at least one of R$^{19}$, R$^{20}$, R$^{21}$ and R$^{22}$ is hydrocarbyl, substituted hydrocarbyl, heterohydrocarbyl or substituted heterohydrocarbyl. More preferably at least one of R$^{19}$ and R$^{20}$, and at least one of R$^{21}$ and R$^{22}$, is hydrocarbyl, substituted hydrocarbyl, heterohydrocarbyl or substituted heterohydrocarbyl. Most preferably R$^{19}$, R$^{20}$, R$^{21}$ and R$^{22}$ are all independently selected from hydrocarbyl, substituted hydrocarbyl, heterohydrocarbyl or substituted heterohydrocarbyl. R$^{19}$, R$^{20}$, R$^{21}$ and R$^{22}$ are preferably independently selected from methyl, ethyl, n-propyl, iso-propyl, n-butyl, sec-butyl, tert.-butyl, n-pentyl, neopentyl, n-hexyl, 4-methylpentyl, n-octyl, phenyl and benzy.

$R^1, R^2, R^3, R^4, R^6, R^{19}, R^{20}, R^{21}, R^{22}, R^{23}, R^{25}, R^{26}$ and $R^{28}$ are preferably independently selected from hydrogen and $C_1$ to $C_8$ hydrocarbyl, for example, methyl, ethyl, n-propyl, n-butyl, t-butyl, n-hexyl, n-octyl, phenyl and benzyl.

A particularly preferred complex has the Formula Z

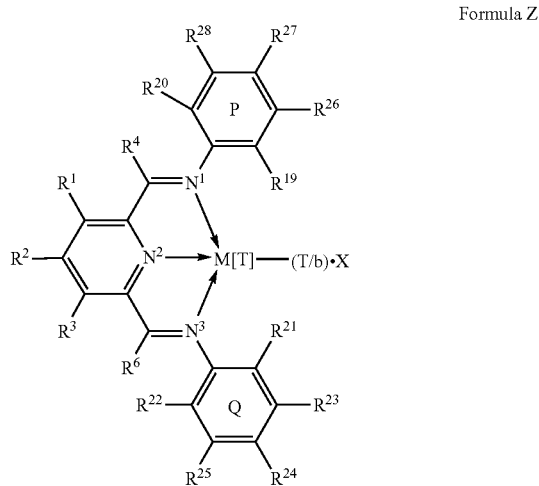

Formula Z wherein $R^1$, $R^2$ and $R^3$ are each independently H, or $C_1$-$C_{10}$ alkyl, aryl or aralkyl and wherein $R^{19}$ to $R^{28}$ are independently selected from hydrogen, halogen, hydrocarbyl, substituted hydrocarbyl, heterohydrocarbyl or substituted heterohydrocarbyl; when any two or more of $R^1$ to $R^4$, $R^6$ and $R^{19}$ to $R^{28}$ are hydrocarbyl, substituted hydrocarbyl, heterohydrocarbyl or substituted heterohydrocarbyl, said two or more can be linked to form one or more cyclic substituents.

Preferred complexes are 2,6-diacetylpyridinebis(2,4,6 trimethyl anil) $FeCl_2$ and 2,6-diacetylpyridinebis(2,6 diisopropyl anil) $FeCl_2$.

In an another embodiment, applicable to all the above structures, $R^5$ is a group having the formula $-NR^{29}R^{30}$ and $R^7$ is a group having the formula $-NR^{31}R^{32}$, wherein $R^{29}$ to $R^{32}$ are independently selected from hydrogen, halogen, hydrocarbyl, substituted hydrocarbyl, heterohydrocarbyl or substituted heterohydrocarbyl, and may be linked to form one or more cyclic substituents. Examples of such compounds are disclosed in WO 00/50470.

Another preferred substituent for both $R^5$ and $R^7$ are pyrazolyl groups, as described in our own co-pending application PCT 02/02247.

Particularly preferred is the substituent having the formula (II):

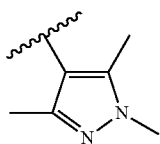

Formula (II)

The atom or group represented by X in the complexes disclosed above can be, for example, selected from halide, sulphate, nitrate, thiolate, thiocarboxylate, $BF_4^-$, $PF_6^-$, hydride, hydrocarbyloxide, carboxylate, hydrocarbyl, substituted hydrocarbyl and heterohydrocarbyl, or β-diketonates. Examples of such atoms or groups are chloride, bromide, methyl, ethyl, propyl, butyl, octyl, decyl, phenyl, benzyl, methoxide, ethoxide, isopropoxide, tosylate, triflate, formate, acetate, phenoxide and benzoate. Preferred examples of the atom or group X in the compounds of Formula (I) are halide, for example, chloride, bromide; hydride; hydrocarbyloxide, for example, methoxide, ethoxide, isopropoxide, phenoxide; carboxylate, for example, formate, acetate, benzoate; hydrocarbyl, for example, methyl, ethyl, propyl, butyl, octyl, decyl, phenyl, benzyl; substituted hydrocarbyl; heterohydrocarbyl; tosylate; and triflate. Preferably X is selected from halide, hydride and hydrocarbyl. Chloride is particularly preferred.

L may be for example an ether such as tetrahydrofuran or diethylether, an alcohol such as ethanol or butanol, a primary, secondary or tertiary amine, or a phosphine.

Catalysts particularly preferred for use in the present invention are selected from those comprising (1) two or more transition metal compounds at least one of which has the following Formula A, and optionally
(2) an activating quantity of a suitable activator,

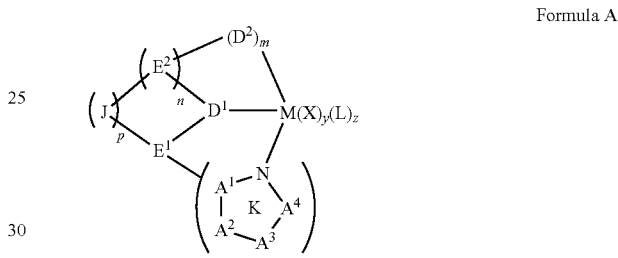

Formula A wherein in the five-membered heterocyclic group K, which can be saturated or unsaturated and unsubstituted or substituted by halide or hydrocarbyl groups, the atoms $A^1$ to $A^4$ comprise at least 2 carbon atoms and at least one atom selected from N, O, P and S, the remaining atom in said ring, if any, being selected from nitrogen and carbon; any 2 or more of $A^1$ to $A^4$ can form part of one or more further ring systems; M is a metal from Group 3 to 11 of the Periodic Table or a lanthanide metal; $E^1$ and $E^2$ are atoms or groups bearing single and or double bond connections and being independently selected from a substituted or unsubstituted carbon atom or (i) aliphatic hydrocarbyl, (ii) alicyclic hydrocarbyl, (iii) aromatic hydrocarbyl, (iv) alkyl substituted aromatic hydrocarbyl (v) heterocyclic groups and (vi) heterosubstituted derivatives of said groups (i) to (v); J is a group comprising one or more carbon atoms and optionally one or more atoms selected from N, O, P and S each of which can be substituted or unsubstituted by halogen or hydrocarbyl groups; $D^1$ and $D^2$ are donor atoms or groups; X is an anionic group, L is a neutral donor group; m, n and p are independently 0 or 1; y and z are independently zero or integers such that the number of X and L groups satisfy the valency and oxidation state of the metal M.

For the avoidance of doubt the term "unsubstituted" as used in relation to a hydrocarbyl or heterocyclic group means that any hydrogen atoms normally associated with such group have not been replaced by other groups or atoms.

$E^1$ can be bonded to any of $A^1$ to $A^4$. Preferably $E^1$ is bonded to $A^1$.

The five-membered heterocyclic group K preferably contains 3 carbon atoms in the ring.

In a preferred embodiment of the present invention K is specifically an imidazole-containing group.

$D^1$ and $D^2$ can be the same or different donor atoms or groups, for example oxygen, sulfur, nitrogen or phosphorus, eg an amine, an imine or a phosphine. Preferably $D^1$ and $D^2$ are selected from oxygen, sulfur, an amine of formula —$N(R^{12})$— or a phosphine of formula —$P(R^{13})$— wherein $R^{12}$ and $R^{13}$ are hydrogen or (i) aliphatic hydrocarbyl, (ii) alicyclic hydrocarbyl, (iii) aromatic hydrocarbyl, (iv) alkyl substituted aromatic hydrocarbyl (v) heterocyclic groups, (vi) heterosubstituted derivatives of said groups (i) to (v), (vii) hydrocarbyl-substituted heteroatom groups and (viii) further imidazole-containing groups.

Preferably $D^1$ is nitrogen for example —$NR^1$— or =N— or a nitrogen-containing group, for example —$N(R^1)$—$R^{20}$— wherein $R^1$ represents a monovalent group and $R^{20}$ represents a divalent group derived from, for example, aliphatic hydrocarbyl groups such as methyl, ethyl, ethylenyl, butyl, hexyl, isopropyl and tert-butyl. Examples of suitable alicyclic hydrocarbyl groups are adamantyl, norbornyl, cyclopentyl and cyclohexyl. Examples of suitable aromatic hydrocarbyl groups are phenyl, biphenyl, naphthyl, phenanthryl and anthryl. Examples of suitable alkyl substituted aromatic hydrocarbyl groups are benzyl, tolyl, mesityl, 2,6-diisopropylphenyl and 2,4,6-triisopropyl. Examples of suitable heterocyclic groups are 2-pyridinyl, 3-pyridinyl, 2-thiophenyl, 2-furanyl, 2-pyrrolyl, 2-quinolinyl. Suitable substituents for forming heterosubstituted derivatives of said groups $R^1$ to $R^{11}$ are, for example, chloro, bromo, fluoro, iodo, nitro, amino, cyano, ether, hydroxyl and silyl, methoxy, ethoxy, phenoxy (i.e. —$OC_6H_5$), tolyloxy (i.e. —$OC_6H_4(CH_3)$), xylyloxy, mesityloxy, dimethylamino, diethylamino, methylethylamino, thiomethyl, thiophenyl and trimethylsilyl. Examples of suitable heterosubstituted derivatives of said groups (i) to (v) are 2-chloroethyl, 2-bromocyclohexyl, 2-nitrophenyl, 4-ethoxyphenyl, 4-chloro-2-pyridinyl, 4-dimethylaminophenyl and 4-methylaminophenyl. Examples of suitable hydrocarbyl-substituted heteroatom groups are chloro, bromo, fluoro, iodo, nitro, amino, cyano, ether, hydroxyl and silyl, methoxy, ethoxy, phenoxy (i.e. —$OC_6H_5$), tolyloxy (i.e. $OC_6H_4(CH_3)$), xylyloxy, mesityloxy, dimethylamino, diethylamino, methylethylamino, thiomethyl, thiophenyl and trimethylsilyl. Any of the substituents $R^1$ to $R^{11}$ may be linked to form cyclic structures. Substituents $R^2$ to $R^{11}$ may also suitably be inorganic groups such as fluoro, chloro, bromo, iodo, nitro, amino, cyano and hydroxyl.

$D^2$ can be, for example, any of the donor atoms or groups specified above for $D^1$.

When $D^1$ and/or $D^2$ are an imidazole-containing group this or these can be identical with K. In a preferred embodiment $D^2$ and K are identical imidazole containing groups.

The imidazole-containing group K is preferably a group selected from Formulae Ia to VIa:

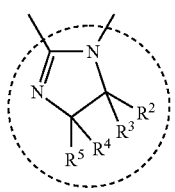

Ia

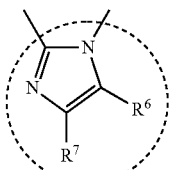

IIa

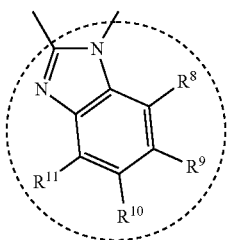

IIIa

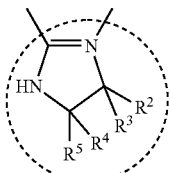

IVa

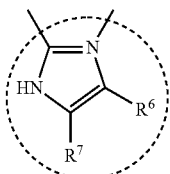

Va

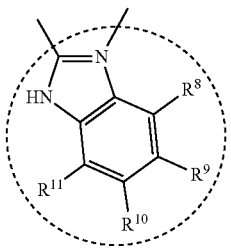

VIa wherein the groups $R^2$ to $R^{11}$ are independently hydrogen or a monovalent (i) aliphatic hydrocarbyl, (ii) alicyclic hydrocarbyl, (ii) aromatic hydrocarbyl, (iv) alkyl substituted aromatic hydrocarbyl (v) heterocyclic groups, (vi) heterosubstituted derivatives of said groups (i) to (v), and (vii) hydrocarbyl-substituted heteroatom groups. It is preferred that the imidazole-containing group has a structure described in formula IIIa or VIa (these are "benzimidazoles").

These defined groups $R^2$ to $R^{11}$ preferably contain 1 to 30, more preferably 2 to 20, most preferably 2 to 12 carbon atoms. Examples of suitable aliphatic hydrocarbyl groups are methyl, ethyl, ethylenyl, butyl, hexyl, isopropyl and tert-butyl. Examples of suitable alicyclic hydrocarbyl groups are adamantyl, norbornyl, cyclopentyl and cyclohexyl. Examples of suitable aromatic hydrocarbyl groups are phenyl, biphenyl, naphthyl, phenanthryl and anthryl. Examples of suitable alkyl substituted aromatic hydrocarbyl groups are benzyl, tolyl, mesityl, 2,6-diisopropylphenyl and 2,4,6-triisopropyl. Examples of suitable heterocyclic groups are 2-pyridinyl, 3-pyridinyl, 2-thiophenyl, 2-furanyl, 2-pyrrolyl, 2-quinolinyl. Suitable substituents for forming heterosubstituted derivatives of said groups $R^2$ to $R^{11}$ are, for example, chloro, bromo, fluoro, iodo, nitro, amino, cyano, ether, hydroxyl and silyl, methoxy, ethoxy, phenoxy (i.e. —OC$_6$H$_5$), tolyloxy (i.e. —OC$_6$H$_4$(CH$_3$)), xylyloxy, mesityloxy, dimethylamino, diethylamino, methylethylamino, thiomethyl, thiophenyl and trimethylsilyl. Examples of suitable heterosubstituted derivatives of said groups (i) to (v) are 2-chloroethyl, 2-bromocyclohexyl, 2-nitrophenyl, 4-ethoxyphenyl, 4-chloro-2-pyridinyl, 4-dimethylaminophenyl and 4-methylaminophenyl. Examples of suitable hydrocarbyl-substituted heteroatom groups are chloro, bromo, fluoro, iodo, nitro, amino, cyano, ether, hydroxyl and silyl, methoxy, ethoxy, phenoxy (i.e. —OC$_6$H$_5$), tolyloxy (i.e. —OC$_6$H$_4$(CH$_3$)), xylyloxy, mesityloxy, dimethylamino, diethylamino, methylethylamino, thiomethyl, thiophenyl and trimethylsilyl. Any of the substituents $R^2$ to $R^{11}$ may be linked to form cyclic structures. Substituents $R^2$ to $R^{11}$ may also suitably be inorganic groups such as fluoro, chloro, bromo, iodo, nitro, amino, cyano and hydroxyl.

$E^1$ and $E^2$ (hereinafter referred to as "E") can be the same or different atoms or groups. E is divalent when p is zero, and trivalent when p=1. E is independently selected from (i) aliphatic hydrocarbyl, (ii) alicyclic hydrocarbyl, (iii) aromatic hydrocarbyl, (iv) alkyl substituted aromatic hydrocarbyl (v) heterocyclic groups, (vi) heterosubstituted derivatives of said groups (i) to (v), and (vii) hydrocarbyl-substituted heteroatom groups. Examples of suitable divalent groups E are —CH$_2$—, —CH$_2$CH$_2$—, —CH$_2$CH$_2$CH$_2$—, 1,2-phenylene, trans-1,2-cyclopentane, trans-1,2-cyclohexane, 2,3-butane, 1,1'-biphenyl, 1,1'-binaphthyl, and —Si(Me)$_2$-. It is preferred that E is an aliphatic or aromatic hydrocarbyl group. More preferably the divalent group E is —CH$_2$—. Examples of suitable trivalent groups E are —CH—, —CHCH$_2$—, —CH$_2$CHCH$_2$—, and —Si(Me)—.

J is a bridging group between $E^2$ and $E^1$. It is preferably a $C_1$ to $C_{12}$ divalent hydrocarbon group. It can, for example, form part of a saturated unsaturated or aromatic ring system. For example, $E^1$, J, $E^2$, $D_1$ and can together from a pyridine, piperidine or pyrrole system wherein $D^1$ is the nitrogen atom and $E^1$, J, $E^2$ from the rest of the ring.

The values of m, n and p in the present invention are independently 0 or 1. Preferably m=n=p. More preferably m and n are both 1 and p is 0 or 1.

When m, n and p are zero in Formula A, the Formula reduces to Formula D.

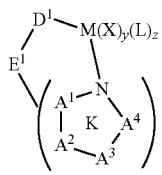

Formula D wherein D1, E1, K, A1 to A4 M, X, L, y and z are as defined above.

The transition metal compounds of Formula A and D can be drawn from a very large variety of compounds. Examples of suitable ligands are illustrated in copending Patent Application WO 2004/083263 published in the name of BP Chemicals on 30 Sep. 2004—see in particular Formulae Nos. 20 to 157.

The five-membered heterocyclic group K contains at least 2 carbon atoms in its ring and preferably has 3 carbon atoms in its ring. Examples of suitable 5-membered heterocyclic groups are shown below wherein one of the nitrogen atoms is bonded to the transition metal and the bond to $E^1$ is depicted by the "free" valency bond:

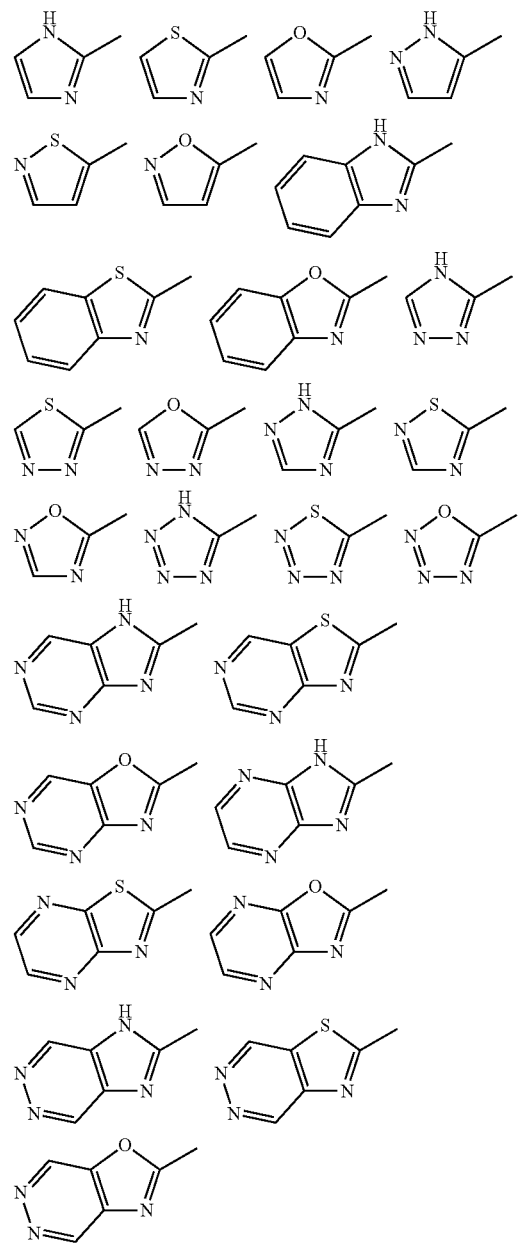

The following are examples of transition metal complexes that can be employed in the catalyst:

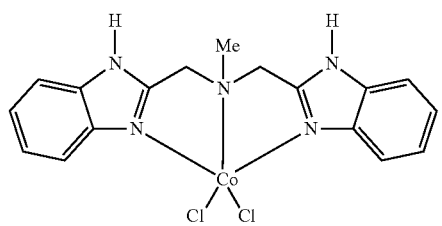

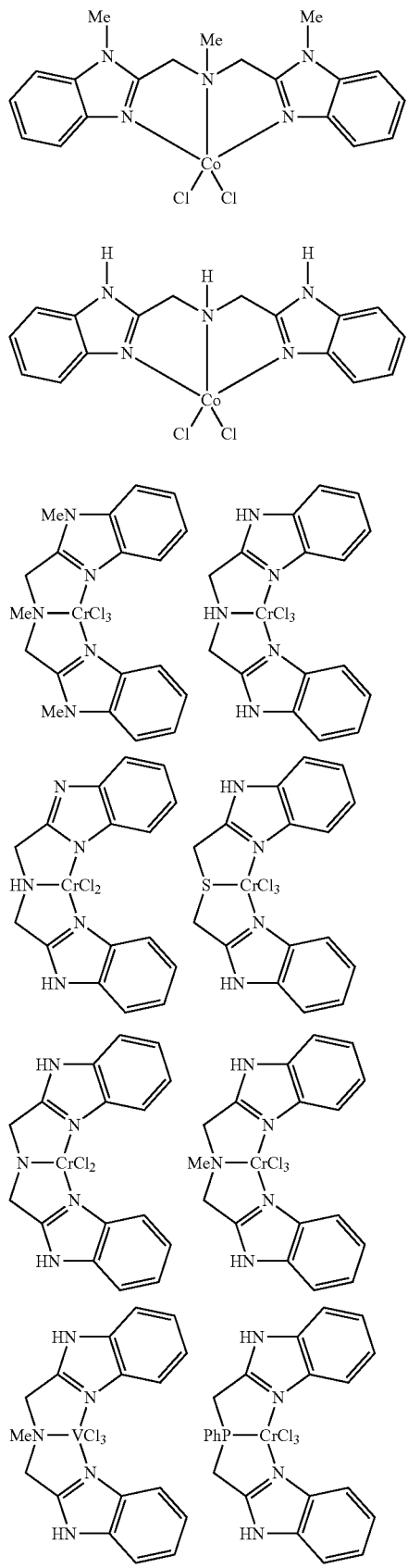
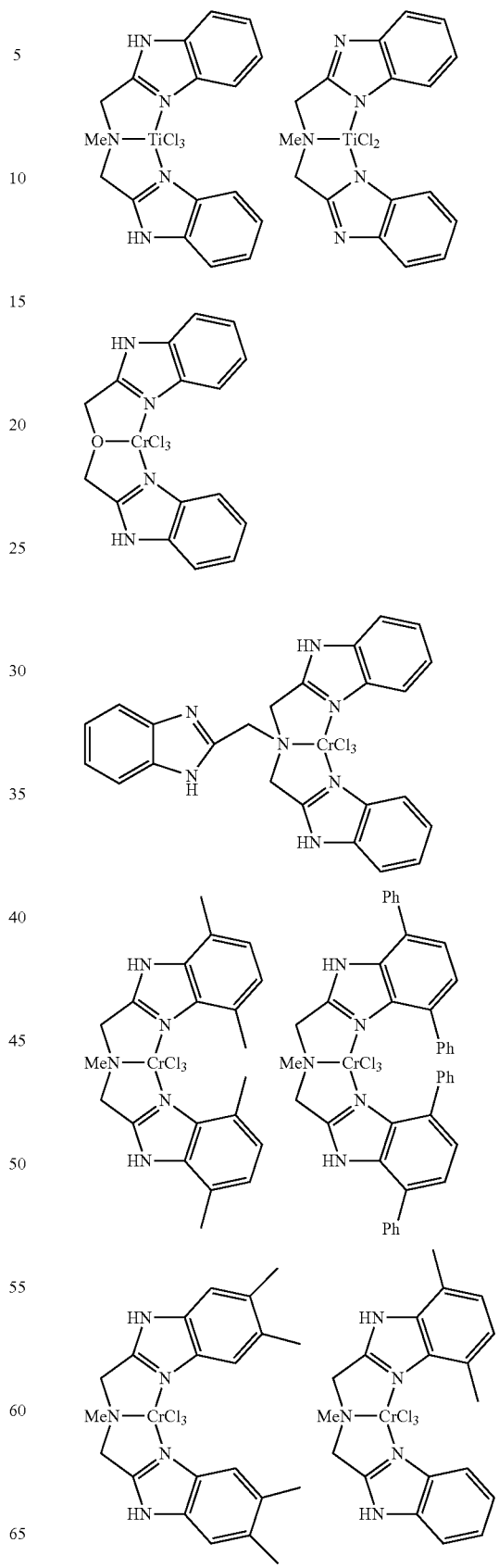

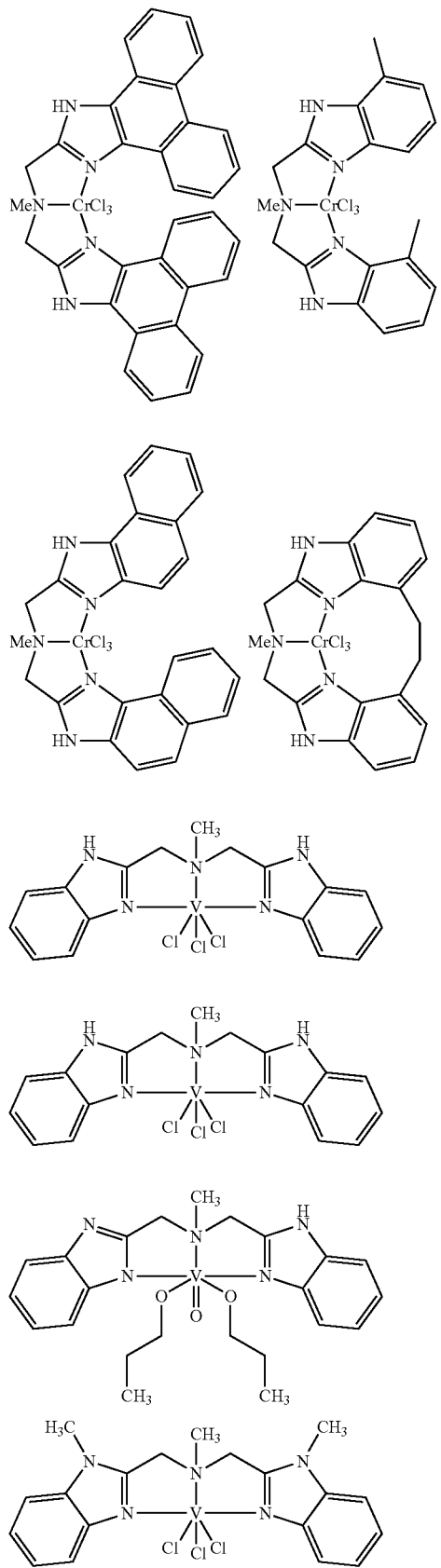
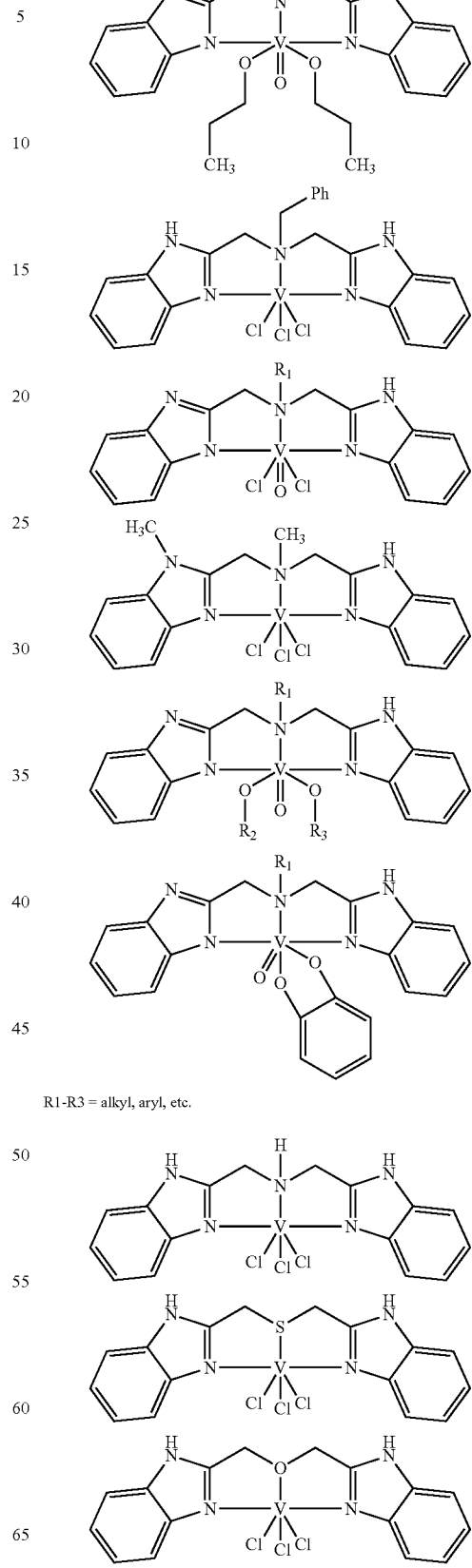
R1-R3 = alkyl, aryl, etc.

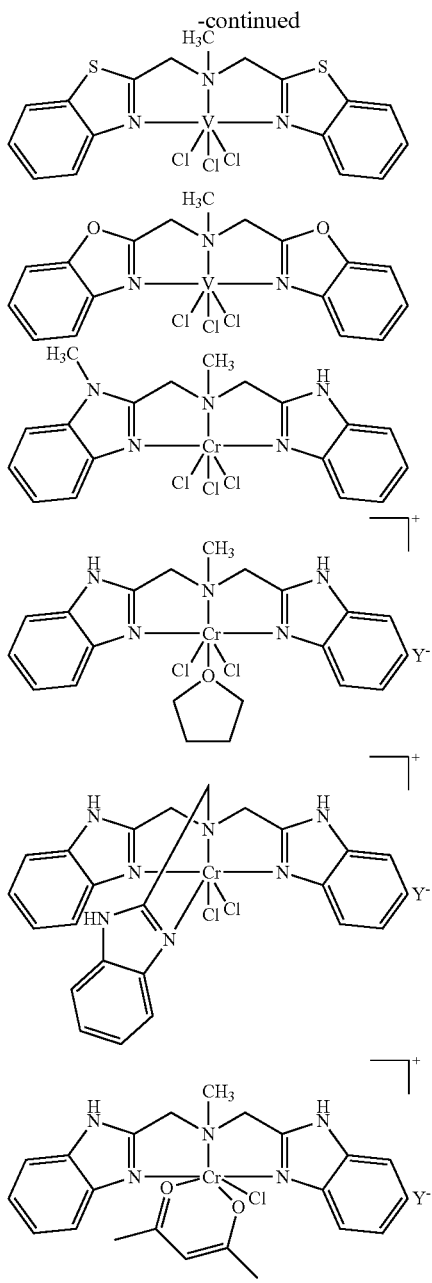

Y = Cl, SbF6, BF4, B(C6F5)4, etc

In Formulae A and D, M is a metal selected from Groups 3 to 11 of the periodic table or a lanthanide such as, for example, neodymium. M is preferably selected from Groups 3 to 10, more preferably selected from Sc, Ti, Zr, Hf, V, Nb, Ta, Cr, Mo, W, Mn and Co. The transition metal of the catalysts used in the process of the present invention is most preferably cobalt, titanium, zirconium, hafnium, vanadium or chromium.

The anionic group X in Formula A can be, for example, a halide, preferably chloride or bromide; or a hydrocarbyl group, for example, methyl, benzyl or phenyl; a carboxylate, for example, acetate or an acetylacetonate; an oxide; an amide, for example diethyl amide; an alkoxide, for example, methoxide, ethoxide or phenoxide; or a hydroxyl. Alternatively, X can be a non-coordinating or weakly-coordinating anion, for example, tetrafluoroborate, a fluorinated aryl borate or a triflate. The anionic groups X may be the same or different and may independently be monoanionic, dianionic or trianionic.

The neutral donor group L can be, for example, a solvate molecule, for example diethyl ether or THF; an amine, for example, diethyl amine, trimethylamine or pyridine; a phosphine, for example trimethyl phosphine or triphenyl phosphine; or water; or an olefin or a neutral, conjugated or non-conjugated diene, optionally substituted with one or more groups selected from hydrocarbyl or trimethylsilyl groups, said group having up to 40 carbon atoms and forming a pi-complex with M. When L is a diene ligand, it can be, for example s-trans-$\eta^4$-1,4-diphenyl-1,3-butadiene; s-trans-$\eta^4$-3-methyl-1,3-pentadiene; s-trans-$\eta^4$-1,4-dibenzyl-1,3-butadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-trans-$\eta^4$-1,4-diphenyl-1,3-butadiene; s-cis-$\eta^4$-3-methyl-1,3-pentadiene; s-cis-$\eta^4$-1,4-dibenzyl-1,3-butadiene; s-cis-$\eta^4$-2,4-hexadiene; s-cis-$\eta^4$-1,3-pentadiene; s-cis-$\eta^4$-1,4-ditolyl-1,3-butadiene; or s-cis-$\eta^4$-1,4-bis(trimethylsilyl)-1,3-butadiene, said s-cis isomers forming a .pi.-bound diene complex;

The value of y depends on the formal charge on each group K and D, the charge on the anionic group X and the oxidation state of the metal M. For example, if M is chromium in oxidation state +3, K is a neutral group and both D groups are neutral, then y is 3 if X is a monoanionic group (eg. chloride); if M is chromium in oxidation state +3, the K group is neutral, one D group is monoanionic and the other D is neutral, then y is 2 if all X groups are monoanionic groups (e.g. chloride).

In the process of the present invention the use of transition metal complexes of the metals cobalt and chromium are preferred, especially complexes of Formula A

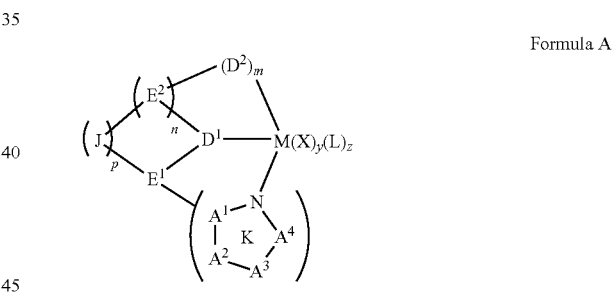

Formula A wherein M is Co or Cr. Most preferably the process of the present invention employs (1) a transition metal compound of Formula A wherein M is Co and a second transition metal compound of Formula A wherein M is chromium.

The optional activator (2) for the catalyst used in the process of the present invention is suitably selected from organoaluminium compounds and organoboron compounds or mixtures thereof. Examples of organoaluminium compounds include trialkyaluminium compounds, for example, trimethylaluminium, triethylaluminium, tributylaluminium, tri-n-octylaluminium, ethylaluminium dichloride, diethylaluminium chloride, tris(pentafluorophenyl)aluminium and alumoxanes. Alumoxanes are well known in the art as typically the oligomeric compounds which can be prepared by the controlled addition of water to an alkylaluminium compound, for example trimethylaluminium. Such compounds can be linear, cyclic or mixtures thereof. Commercially available alumoxanes are generally believed to be mixtures of linear, cyclic and cage compounds. The cyclic alumoxanes can be represented by the formula $[R^{16}AlO]_s$ and the linear alumoxanes by the formula $R^{17}(R^{18}AlO)_s$ wherein s is a number from about 2 to 50, and wherein $R^{16}$, $R^{17}$, and $R^{18}$ represent hydrocarbyl groups, preferably $C_1$ to $C_6$ alkyl groups, for example methyl, ethyl or butyl groups.

Examples of suitable organoboron compounds are dimethylphenylammoniumtetra(phenyl)borate, tritytetra(phenyl) borate, triphenylboron, dimethylphenylammonium tetra(pentafluorophenyl)borate, sodium tetrakis[(bis-3,5-trifluoromethyl)phenyl]borate, $H^+(OEt_2)[(bis-3,5-trifluoromethyl)phenyl]$borate, tritytetra (pentafluorophenyl)borate and tris(pentafluorophenyl)boron. Mixtures of organoaluminium compounds and organoboron compounds may be used.

The quantity of the optional activator compound used in the process of the present invention ie, the activator selected from organoaluminium compounds and organoboron compounds, is easily determined by simple testing, for example, by the preparation of small test samples which can be used to polymerise small quantities of the monomer(s) and thus to determine the activity of the produced catalyst. It is generally found that the quantity employed is sufficient to provide 0.1 to 20,000 atoms, preferably 1 to 2000 atoms of aluminium or boron per atom of M present in the compound of Formula A. Mixtures of different activating compounds may be used.

EP1238989 discloses the use of activators (Lewis acids) selected from
- (b-1) ionic-bonding compounds having a $CdCl_2$ type or a $CdI_2$ type of layered crystal structure;
- (b-2) clays, clay minerals, or ion-exchange layered compounds;
- (b-3) heteropoly-compounds; and
- (b-4) halogenated lanthanoid compounds.

The optional activator employed in the present invention may be of the type disclosed in EP1238989 if desired. Such Lewis acids are those compounds which capable of receiving at least one electron pair and is capable of forming an ion pair by reaction with the transition metal complex. The Lewis acid includes the afore-mentioned (b-1) ionic-bonding compounds having a layered crystal structure of a $CdCl_2$ type or $CdI_2$ type (b-2) clay, clay minerals, or ion-exchange layered compounds, (b-3) heteropoly compounds, and (b-4) halogenated lanthanoid compounds. The Lewis acid further includes $SiO_2$, $Al_2O_3$, natural and synthetic zeolites which have Lewis acid points formed by heating or a like treatment, and complexes and mixtures thereof.

U.S. Pat. No. 6,399,535 discloses a coordinating catalyst system capable of polymerizing olefins comprising:
(I) as a pre-catalyst, at least one non-metallocene, non-constrained geometry, bidentate ligand containing transition metal compound or tridentate ligand containing transition metal compound capable of (A) being activated upon contact with the catalyst support-activator agglomerate of (II) or (B) being converted, upon contact with an organometallic compound, to an intermediate capable of being activated upon contact with the catalyst support-activator agglomerate of (II), wherein the transition metal is at least one member selected from Groups 3 to 10 of the Periodic table; in intimate contact with (II) catalyst support-activator agglomerate comprising a composite of (A) at least one inorganic oxide component selected from $SiO_2$, $Al_2O_3$, MgO, $AlPO_4$, $TiO_2$, $ZrO_2$, and $Cr_2O_3$ and (B) at least one ion containing layered material having interspaces between the layers and sufficient Lewis acidity, when present within the catalyst support-activator agglomerate, to activate the pre-catalyst when the pre-catalyst is in contact with the catalyst support-activator agglomerate, said layered material having a cationic component and an anionic component, wherein said cationic component is present within the interspaces of the layered material, said layered material being intimately associated with said inorganic oxide component within the agglomerate in an amount sufficient to improve the activity of the coordinating catalyst system for polymerizing ethylene monomer, expressed as Kg of polyethylene per gram of catalyst system per hour, relative to the activity of a corresponding catalyst system employing the same pre-catalyst but in the absence of either Component A or B of the catalyst support-activator agglomerate; wherein the amounts of the pre-catalyst and catalyst support-activator agglomerate which are in intimate contact are sufficient to provide a ratio of micromoles of pre-catalyst to grams of catalyst support-activator agglomerate of from about 5:1 to about 500:1. The layered material can be, for example, a smectite clay. The catalyst system of the present invention can be employed with a catalyst support-activator agglomerate as described in U.S. Pat. No. 6,399,535 if desired.

In addition to the optional activator compound, it can be advantageous to employ catalytic quantities of certain halogenated compounds that are capable of promoting catalyst activity. Promotors of this type are especially useful in the case that the transition metal in the complex is vanadium. U.S. Pat. No. 5,191,042 discloses that certain vanadium-based catalysts activated with organoaluminium compounds can be promoted using a variety of halogenated organic compounds, for example, carbon tetrachloride, hexachloroethylene, benzylbromide, benzylchloride and 2,3- or 1,3-dichloropropylene. Other examples of halogenated organic compounds that can be used in this manner are ethyl trichloroacetate, chloroform ($CHCl_3$) and n-butylchloride. U.S. Pat. No. 5,191,042 also refers to the disclosure of Cooper (T. A Cooper, Journ. Am. Chem. Soc., 4158 (1973), which defines in Table 1 an organic halide activity index based on the ability of the halide to oxidize certain vanadium compounds under standard conditions. For example, carbon tetrachloride is assigned a reactivity of 1 in tetrahydrofuran at 20° C., and other listed halogenated organic compounds have reactivities of from about 0.02 to greater than 200 relative to carbon tetrachloride. When it is desired to use a halogenated promoter, it is preferred to use those having a Cooper Index ranging from about 0.01 up to about 30. The use of such promoters, especially in combination with vanadium-based catalysts is generally well known in the art, and for details of use of the such promoters reference may be made to U.S. Pat. No. 5,191,042 and to other prior art in this field. In the present invention it is possible to employ any halogenated organic compound as a promoter, but the compounds mentioned above are preferred.

The catalysts employed in the present invention comprise more than one of the defined transition metal compounds. This is particularly useful when it is desired to make poly dienes having a specifically desired ratio of cis to trans polymer. For example it is found that the use of complexes of Formula A (and preferably of Formula D) containing chromium as the transition metal favour the formation of trans polydiene, whereas the use of such complexes containing cobalt as the transition metal favour the formation of cis polydiene. Thus in the polymerisation of diene in the presence of the mixed catalysts, the ratio of two (or more) catalysts (eg one cobalt-based and the other chromium-based) can be adjusted to provide a desired ration of cis/trans polymer in the product.

In addition to said one or more defined transition metal compounds, the catalysts of the present invention can also include one or more other catalysts for polymerising dienes.

The catalyst or catalysts employed in the process of the present invention can be utilised, if desired, using processes analogous to those disclosed in WO02/46246 and U.S. Pat. No. 6,605,675. For example, a catalyst component slurry and a catalyst component solution can be combined before or during introduction into the polymerisation reactor. The properties of polymers produced using such methods can be advantageously controlled thereby. The catalysts of the present invention can also be employed in the process disclosed in U.S. Pat. No. 6,610,799. In this process, mixtures of two or more supported catalysts can be utilised containing differing amounts of catalyst components wherein the concentrations of the individual catalyst components can be independently controlled within the polymerisation reactor.

One or more of the catalysts, and or components thereof, used in the process of the present invention can, if desired, be utilised on a support material. Thus, for example, the catalyst system can comprise one or more transition metal compounds supported on the same or different types of support material and one or more activators supported on the same or different support materials. Suitable support materials are, for example, silica, alumina, or zirconia, magnesia, magnesium chloride or a polymer or prepolymer, for example polyethylene, polystyrene, or poly(aminostyrene).

If desired the catalysts can be formed in situ in the presence of the support material, or the support material can be pre-impregnated or premixed, simultaneously or sequentially, with one or more of the catalyst components. Formation of the supported catalyst can be achieved for example by treating the transition metal compounds of the present invention with alumoxane in a suitable inert diluent, for example a volatile hydrocarbon, slurrying a particulate support material with the product and evaporating the volatile diluent. The produced supported catalyst is preferably in the form of a free-flowing powder. The quantity of support material employed can vary widely, for example from 100,000 to 1 grams per gram of metal present in the transition metal compound.

The monomer employed in the polymerisation process of the present invention comprises a diene having the general formula $R^1R^2C{=}CR^3CR^4{=}CR^5CR^6$ wherein $R^1$ to $R^6$ are independently selected from hydrogen, halogen, alkyl, cycloalkyl, aryl, aralkyl, and alkaryl. For example the monomer can be a diene having substitution selected from one or more of chloro, methyl, ethyl, n-propyl, isopropyl, or single or mixtures of isomeric forms of pentyl, hexyl, octyl, decyl; or aryl groups selected from, for example, phenyl, 2 chlorophenyl, o-biphenyl, naphthyl, phenanthryl and anthryl; or alkaryl groups selected from, for example, phenylmethyl, phenylethyl, phenyl-n-propyl, naphthylmethyl; or aralkyl groups, for example, tolyl, xylyl, mesityl or 2-methylnaphthyl. However, when the diene is too heavily substituted by bulky groups it may be difficult or impossible to cause the diene to polymerise due to steric hindrance. The diene employed preferably has the general formula $R^1H{=}C{=}CR^3{-}CH{=}CH_2$ wherein $R^1$ and $R^3$ are independently selected from hydrogen, chlorine and a $C_1$ to $C_{10}$ hydrocarbyl group. Preferred dienes are 1,3-butadiene, 2-methyl-1,3-butadiene (isoprene), and 2-chloro-1,3-butadiene (chloroprene).

The optional comonomer 1-olefin is any suitable 1-olefin, preferably $C_2$ to $C_{20}$ 1-olefin, capable of being copolymerised with a diene to form the defined polymer. Examples of such olefins are ethylene, propylene, butene, hexene, 4-methylpentene-1, 1-octene, norbornene, substituted norbornenes and styrene.

The polymerisation process of the present invention can be carried out in a single reactor or in one or more reactors placed in series or in parallel. In the case that a single reactor is used, the reactor is fed with monomeric material and at least two transition metal compounds. The transition metal compounds can be fed separately or together. If desired the transition metal compounds can be fed simultaneously or at different times. In the case that two or more reactors are used in series, the first reactor is fed with at least one of the transition metal compound and the first and/or at least one further reactor is fed with at least one further transition metal compound. The polymerisation conditions can be, for example, bulk phase, solution phase, slurry phase or gas phase. If desired, the catalyst can be used to polymerise the monomer under high pressure/high temperature process conditions wherein the polymeric material forms as a melt in supercritical monomer. Preferably the polymerisation is conducted under solution phase or gas phase fluidised or stirred bed conditions. In these processes the polymerisation conditions can be batch, continuous or semi-continuous. In the slurry phase process and the gas phase process, the catalyst is generally fed to the polymerisation zone in the form of a particulate solid. This solid can be, for example, an undiluted solid catalyst system formed from the one or more of the defined transition metal compounds and optionally an activator, or can be the solid transition metal compound(s) alone. In the latter situation, the activator can be fed to the polymerisation zone, for example as a solution, separately from or together with the solid transition metal compound. Preferably the catalyst system or the transition metal compound component of the catalyst system employed in slurry polymerisation and gas phase polymerisation is supported on a support material. Most preferably the catalyst system is supported on a support material prior to its introduction into the polymerisation zone. Suitable support materials are, for example, silica, alumina, zirconia, talc, kieselguhr, magnesia, magnesium chloride and polymers. Impregnation of the support material can be carried out by conventional techniques, for example, by forming a solution or suspension of the catalyst components in a suitable diluent or solvent, and slurrying the support material therewith. The support material thus impregnated with catalyst can then be separated from the diluent for example, by filtration or evaporation techniques.

In the slurry phase polymerisation process the solid particles of catalyst, or supported catalyst, are fed to a polymerisation zone either as dry powder or as a slurry in the polymerisation diluent. Preferably the particles are fed to a polymerisation zone as a suspension in the polymerisation diluent. The polymerisation zone can be, for example, an autoclave or similar reaction vessel, or a continuous loop reactor, e.g. of the type well know in the manufacture of polyethylene by the Phillips Process. When the polymerisation process of the present invention is carried out under slurry conditions the polymerisation is preferably carried out at a temperature above 0° C., most preferably above 15° C. The polymerisation temperature is preferably maintained below the temperature at which the polymer commences to soften or sinter in the presence of the polymerisation diluent. If the temperature is allowed to go above the latter temperature, fouling of the reactor can occur. Adjustment of the polymerisation within these defined temperature ranges can provide a useful means of controlling the average molecular weight of the produced polymer. A further useful means of controlling the molecular weight is to conduct the polymerisation in the presence of hydrogen gas which acts as chain transfer agent. Generally, the higher the concentration of hydrogen employed, the lower the average molecular weight of the produced polymer.

The use of hydrogen gas as a means of controlling the average molecular weight of the polymer or copolymer applies generally to the polymerisation process of the present invention. For example, hydrogen can be used to reduce the average molecular weight of polymers or copolymers prepared using gas phase, slurry phase or solution phase polymerisation conditions. The quantity of hydrogen gas to be employed to give the desired average molecular weight can be determined by simple "trial and error" polymerisation tests.

Methods for operating gas phase polymerisation processes are well known in the art. Such methods generally involve agitating (e.g. by stirring, vibrating or fluidising) a bed of catalyst, or a bed of the target polymer (i.e. polymer having the same or similar physical properties to that which it is desired to make in the polymerisation process) containing a catalyst, and feeding thereto a stream of monomer at least partially in the gaseous phase, under conditions such that at least part of the monomer polymerises in contact with the catalyst in the bed. The bed is generally cooled by the addition of cool gas (e.g. recycled gaseous monomer) and/or volatile liquid (e.g. a volatile inert hydrocarbon, or gaseous monomer which has been condensed to form a liquid). The polymer produced in, and isolated from, gas phase processes forms directly a solid in the polymerisation zone and is free from, or substantially free from liquid. As is well known to those skilled in the art, if any liquid is allowed to enter the polymerisation zone of a gas phase polymerisation process the quantity of liquid is small in relation to the quantity of polymer present in the polymerisation zone. This is in contrast to "solution phase" processes wherein the polymer is formed dissolved in a solvent, and "slurry phase" processes wherein the polymer forms as a suspension in a liquid diluent.

The gas phase process can be operated under batch, semi-batch, or so-called "continuous" conditions. It is preferred to operate under conditions such that monomer is continuously recycled to an agitated polymerisation zone containing polymerisation catalyst, make-up monomer being provided to replace polymerised monomer, and continuously or intermittently withdrawing produced polymer from the polymerisation zone at a rate comparable to the rate of formation of the polymer, fresh catalyst being added to the polymerisation zone to replace the catalyst withdrawn form the polymerisation zone with the produced polymer.

When operating the process of the present invention under gas phase polymerisation conditions, the catalyst, or one or more of the components employed to form the catalyst can, for example, be introduced into the polymerisation reaction zone in liquid form, for example, as a solution in an inert liquid diluent. Thus, for example, the transition metal component, or the activator component, or both of these components can be dissolved or slurried in a liquid diluent and fed to the polymerisation zone. Under these circumstances it is preferred the liquid containing the component(s) is sprayed as fine droplets into the polymerisation zone. The droplet diameter is preferably within the range 1 to 1000 microns. EP-A-0593083, the teaching of which is hereby incorporated into this specification, discloses a process for introducing a polymerisation catalyst into a gas phase polymerisation. The methods disclosed in EP-A-0593083 can be suitably employed in the polymerisation process of the present invention if desired.

A problem that can occur in the gas and slurry phase polymerisation of olefins is that of fouling of the reactor walls, any stirrer that may be present and spalling or agglomeration of the polymer due, for example, to the presence of static electricity. The problem can be reduced or eliminated by judicious use of suitable antistatic agents. One example of a family of antistatic agents suitable for use in the polymerisation of olefins are commercially available under the trade name "STADIS".

The process of the present invention can be carried out in conventional commercial polymerisation facilities and its use can be sandwiched between production runs using other commercial catalyst systems of the supported or unsupported type, eg, using Ziegler Natta catalysts, metallocene catalysts, heat activated chromium oxide catalysts and late transition metal catalyst systems. Transitioning between catalyst systems of these types has been extensively described in the prior art and reference may be made to the prior art methods for analogously suitable methods readily adaptable to use of the catalyst of the present invention. For example, see EP 751965, U.S. Pat. No. 5,442,019, U.S. Pat. No. 5,672,665, U.S. Pat. No. 5,747,612, U.S. Pat. No. 5,753,786, EP 830393, U.S. Pat. No. 5,672,666, EP1171486, EP885247, EP1182216, U.S. Pat. No. 6,284,849. US2004/0127655, WO04/060938, US2004/0138391, WO, 04/060921, WO04/060922, WO04/060929, WO04/060930, and WO04/060931.

Preferably the polymers of the present invention contain not more than 1.0 moles %, more preferably <0.7 moles %, even more preferably <0.5 moles % percent, most preferably <0.1 moles % of pendant vinyl groups based on the molar content of polymerised diene units. Levels of pendant vinyl groups about 0.01% or less are particularly preferred.

The present invention is illustrated in the following Examples.

Examples 1 and 2 show the preparation of ligands which can be used to make transition metal complexes suitably employed in the present invention. Examples 3 and 4 show the preparation of a variety of chromium complexes. Comparative Example 5 shows homo and copolymerisation of butadiene using single transition metal catalyst systems. Example 6 shows the preparation of a cobalt complex and a comparative polymerisation of butadiene therewith. Example 7 illustrates the preparation of butadiene polymers having carrying cis/trans content using the process of the present invention.

EXAMPLES

Experimental Procedure

All manipulations were carried out under an atmosphere of $N_2$ using standard Schlenk techniques or conventional nitrogen-filled dry-box. Diethyl ether was dried over sodium benzophenone ketyl and distilled under nitrogen. THF was dried over potassium and distilled under nitrogen. Toluene and pentane were dried by passing through a column filled with commercially available Q-5 reactant (Cu(II)O on alumina 13% w/w) and activated alumina (pellets, 3 mm). MAO (Crompton GMBH) was used without further purification.

Polymer Characterisation

The average molecular weighs ($M_w$ and $M_n$) of polybutadienes were determined by gel-permeation chromatography (GPC) using polystyrene standards and chloroform (HPLC grade) as solvent at 35° C. $^{13}C$ NMR spectra were recorded on a Jeol 270 MHz spectrometer operating at 130° C. using $C_2D_2Cl_4$ or a mixture of $C_2D_2Cl_4C_6H_3Cl_3$ (1:2) as solvent. $^1H$ NMR measurements were performed with a Bruker AC-250 MHz spectrometer operating at 25° C. using $CDCl_3$ as solvent. IR spectra were obtained on a Perkin Elmer 1760X FT-IR (KBr disc).

Example 1

Synthesis of Imino Diacetic Esters

The diesters 1a-1f (see below and Table 1) were obtained by reacting two equivalents of ethyl bromoacetate with the corresponding substituted amine in the presence of potassium carbonate (Scheme 1).

TABLE 1

RNH$_2$ + 2 BrCH$_2$C(O)OCH$_2$CH$_3$ $\xrightarrow{3 \text{ K}_2\text{CO}_3}$ RN(CH$_2$CO(O)CH$_2$CH$_3$)$_2$

| Compound | R |
|---|---|
| 1a | Hexyl |
| 1b | $^i$Pr |
| 1c | Cyclohexyl |
| 1d | $^n$Bu |
| 1e | $^t$Bu |
| 1f | CH$_2$CH$_2$OMe |

Synthesis of N,N-diethylacetate-N-hexylamine (1a)

This compound was synthesised via slight modification of a literature procedure[1]. N-hexylamine (7.66 g, 75.7 mmol) and K$_2$CO$_3$ (10.46 g, 75.7 mmol) were combined and cooled to −20° C.

Under vigorous stirring, two equivalents of ethyl bromoacetate (25.23 g, 151 mmol) were slowly added to the mixture. The mixture was stirred at −20° C. for 1 h or until no further evolution of CO$_2$ was observed. It was then placed in an oil bath at 70° C. and the reaction proceeded overnight at this temperature. After allowing the mixture to cool to room temperature, it was extracted with diethyl ether (3×20 ml) and the extracts combined. The solvent was removed to afford 1a as a pale-yellow oil. B.p. 115 C/0.05 mmHg. Yield 20 g (97.5%) $^1$H NMR (400.13 MHz, DMSO-d$_6$, r.t.) δ 0.84 (t, 3H, CH$_3$), 1.04 (t, 2H, CH$_2$), 1.16 (t, 6H, CH$_3$), 1.23 (broad m, 6H, CH$_2$), 1.34 (broad m, 2H, CH$_2$), 3.44 (s, 4H, 2×CH$_2$), 4.04 (quartet, 4H, 2×CH$_2$). $^{13}$C NMR (100.6 MHz, DMSO-d$_6$, r.t.) δ 13.89 (CH$_3$), 14.08 (2×CH$_3$), 18.53 (CH$_2$), 22.09 (CH$_2$), 26.20 (CH$_2$), 27.19 (NCH$_2$), 31.14 (CH$_2$), 54.53 (2×NCH$_2$), 59.75 (2×OCH$_2$). 170.76 (—C=O). Anal. Calc. For C$_{14}$H$_{27}$NO$_4$ (in %) C, 61.51; H, 9.96; N, 5.12. Found C, 61.36; H, 10.16; N, 4.95. +CI MS: (m/z): 274 ([MH$^+$]).

Synthesis of N,N-diethylacetate-N-isopropylamine (1b)

An analogous procedure was used to that described for 1a using isopropylamine (3.99 g, 67.5 mmol), K$_2$CO$_3$ (9.33 g, 67.5 mmol) and ethyl bromoacetate (22.59 g, 135 mmol). B.p. 110° C., 0.05 mmHg. Yield 14.55 g (93%). $^1$H NMR (250.13 MHz, DMSO-d$_6$, r.t.) δ 0.94 (d, 6H, J$^3$=7.4 Hz, CH$_3$), 1.16 (t, 6H, CH$_2$CH$_3$), 2.98 (h, J$^3$=6.6 Hz, 1H, (CH$_3$)$_2$CH), 3.42 (s, 4H, CH$_2$), 4.04 (quartet, 4H, —CH$_3$CH$_2$). $^{13}$C NMR (100.6 MHz, DMSO-d$_6$, rt) δ 14.03 (CH(CH$_3$)$_2$), 19.68 (CH$_2$CH$_3$), 51.95 (CH$_3$)$_2$CH), 52.00 (CH$_3$CH$_2$), 59.73 (CH$_3$CH$_2$). Anal. Calc. for C$_{11}$H$_{21}$NO$_4$ (in %) C, 57.12; H, 9.15; N, 6.06. Found C, 57.03; H, 9.20; N, 5.94. +CI MS: (m/z): 232 ([MH]$^+$).

Synthesis of N,N-diethylacetate-N-cyclohexylamine (1c)

An analogous procedure was used to that described for 1a using cyclohexylamine (6.70 g, 67.5 mmol), K$_2$CO$_3$ (9.33 g, 67.5 mmol) and ethyl bromoacetate (22.59 g, 135 mmol). B.p. 100° C./0.05 mmHg. Yield 15 g (82%). $^1$H NMR (250.13 MHz, DMSO-d$_6$, r.t.), δ 1.02-1.11 (m, J$^3$=8 Hz, 6H, Cyh-CH$_2$), 1.15 (t, 3H, CH$_3$), 1.51 (broad d, 1H, Cyh-CH), 1.65-1.75 (broad dd, 4H, Cyh-CH$_2$), 3.47 (s, 4H, CH$_3$CH$_2$), 4.04 (q, 4H, CH$_3$CH$_2$). $^{13}$C NMR (100.6 MHz, DMSO-d$_6$, r.t.) δ 13.87 (CH$_3$), 25.09 (CH$_2$), 25.48 (CH), 30.16 (CH$_2$), 52.06 (NCH$_2$), 59.56 (CH$_3$CH$_2$), 171.48 (C=O). Anal. Calc. for C$_{14}$H$_{25}$NO$_4$ (in %) C, 61.97; H, 9.29; N, 5.16. Found C, 61.86; H, 9.35; N, 5.00. +CI MS: (m/z): 272 ([MH]$^+$).

Synthesis of N,N-diethylacetate-N-butylamine (1d)

An analogous procedure was used to that described for 1a using n-butylamine (3.3 g, 45 mmol), K2CO3 (15.5. g, 112 mmol) and ethylbromoacetate (15 g, 90 mmol). B.p. 100° C./0.05 mmHg. Yield 9 g (78%). 1H NMR (250.13 MHz, DMSO-d6, r. t.), δ 0.84 (s, 3H, CH2CH3), 1.20 (t, 6H, CH2CH3), 1.28 (m, 4H, 2×CH2), 2.59 (t, 2H, CH2CH2), 3.45 (s, 4H, NCH2), 4.06 (q, 4H, CH3CH2). 13C NMR (62.9 MHz, CD3OD, r. t.) δ 14.81 (CH3), 21.41 (CH2), 30.96 (CH2), 55.26 (CH2), 55.92 (NCH2), 61.55 (CH2), 172.50 (C=O). Anal. Calc. for C$_{12}$H$_{23}$NO$_4$ (in %) C, 58.75; H, 9.45; N, 5.71. Found C, 58.70; H, 9.45; N, 5.56. +CI MS: (m/z): 246 ([MH]$^+$), 273 ([M+NH$_4$]$^+$).

Synthesis of N,N-diethylacetate-N-tert-butylamine (1e)

An analogous procedure was used to that described for 1a using tert-butylamine (4.95 g, 67.6 mmol), K2CO3 (9.34 g, 67.6 mmol) and ethyl bromoacetate (22.59 g, 135 mmol). B.p. 120° C./0.05 mmHg. Yield 13.60 g (82%). 1H NMR (250.13 MHz, DMSO-d6, r. t.), δ 1.02 (s, 9H, C(CH3)3), 1.16 (t, 6H, CH2CH3), 3.45 (s, 4H, CH2), 4.03 (quartet, 4H, CH3CH2). 13C NMR (100.6 MHz, DMSO-d6, r. t.) δ 13.96 (CH2CH3), 27.19 (C(CH3)3), 50.70 (CH2), 54.40 (C(CH3)3), 59.62 (CH3CH2), 172.13 (C=O). Anal. Calc. for C12H23NO4 (in %) C, 58.75; H, 9.45; N, 5.71. Found C, 58.94; H, 9.47; N, 5.57. +CI MS: (m/z): 246 ([MH]+).

Synthesis of N,N-diethylacetate-N-(2-methoxy)ethylamine (1f)

1f was synthesised according to the published procedure[1]. B.p. 110° C./0.05 mmHg. Yield 31 g (95%). $^1$H NMR (400.13 MHz, DMSO-d$_6$, r.t.), δ 1.17 (t, 6H, CH$_2$CH$_3$), 2.81 (t, 2H, NCH$_2$), 3.17 (s, 3H, OCH$_3$), 3.38 (t, 2H, OCH$_2$), 3.52 (s, 4H, NCH$_2$), 4.04 (d, 4H, CH$_3$CH$_2$). $^{13}$C NMR (100.6 MHz, DMSO-d$_6$, r.t.) δ 13.99 (CH$_2$CH$_3$), 52.82 (NCH$_2$), 55.13 (NCH$_2$), 57.81 (OCH$_2$), 59.70 (CH$_3$CH$_2$), 71.14 (OCH$_2$), 170.77 (C=O). Anal. Calc. for C$_{11}$H$_{21}$NO$_5$ (in %) C, 53.43; H, 8.56; N, 5.66. Found C, 53.33; H, 8.54; N, 5.56. +CI MS: (m/e): 248 ([MH]$^+$).

Example 2

Synthesis of N-Substituted BIMA Compounds

N-substituted BIMA compounds were synthesised by condensation of phenylenediamine with either the iminodiacetic acid or the iminodiacetic ester (see below and Table 2). Both routes afforded the corresponding BIMA compounds in quantitative yields. When the condensation involves an iminodiacetic acid (R$_2$=H), the reaction is carried out using ethylene glycol as a solvent. In contrast, condensations of the iminodiacetic esters with phenylenediamine proceed solvent-free. Analytically pure, coloured solids of BIMA compounds, 2a-2h, were obtained after recrystallisation from methanol/water.

TABLE 2 o-phenylenediamine + $R_1N(CH_2C(O)OR_2)_2$ → $[benzimidazol-2-ylmethyl]_2NR_1$

| Compound | $R_1$ | $R_2$ |
|---|---|---|
| 2a | H | H[a] |
| 2b | Me | H[a] |
| 2c | —(CH$_2$)$_3$Ph | H |
| 2d | Bn | H[a] |
| 2e | Hexyl | —CH$_2$CH$_3$ |
| 2f | $^i$Pr | —CH$_2$CH$_3$ |
| 2g | Cyclohexyl | —CH$_2$CH$_3$ |
| 2h | Phenyl | H[a] |

Synthesis of N,N-bis(1H-benzimidazol-2-ylmethyl)-N-amine (2a)

o-Phenylenediamine (24.36 g, 225.56 mmol) and iminodiacetic acid (15 g, 112.78 mmol) were stirred in ethyleneglycol (20 ml) at 190° C. for 4 hours. The water by-product was distilled from the reaction mixture which was then allowed to cool to room temperature. The product was triturated with water (120 ml), filtered, washed with water (4×20 ml), recrystallised from hot methanol-water (1:30) and finally dried at 60° C. under vacuum for two days. Yield 29.16 g (94%). $^1$H NMR (250.13 MHz, CD$_3$OD, r.t.), δ 2.29 (s, 3H, NCH$_3$), 3.92 (s, 4H, N(CH$_2$)$_2$), 7.19-7.23 (m, J$^3$=3.35 Hz, 4H, ArH), 7.52-7.56 (m, J$^3$=3.35 Hz, 4H, ArO). $^{13}$C NMR (62.9 MHz, DMSO-d$_6$, r.t.) δ 51.70 (NCH$_2$), 126.55 (ArC), 159.16 (ArCq). Anal. Calc. for C$_{17}$H$_{17}$N$_5$ (in %) C, 70.10; H, 5.84; N, 24.05. Found C, 70.22; H, 6.05; N, 23.76. +CI MS: (m/z): 274 ([M-2H]$^+$).

Synthesis of N,N-bis(1H-benzimidazol-2-ylmethyl)-N-methylamine (2b)

2b was synthesised by an analogous procedure to that described for 2a using o-phenylenediamine (5.88 g, 54.40 mmol) and methyliminodiacetic acid (4.00 g, 27.2 mmol) in ethyleneglycol (20 ml). Yield 6.88 g (87%). $^1$H NMR (250.13 MHz, CD$_3$OD, r.t.), δ 2.29 (s, 3H, NCH$_3$), 3.92 (s, 4H, N(CH$_2$)), 7.19-7.23 (m, J$^3$=3.35 Hz, 4H, ArH), 7.52-7.56 (m, J$^3$=3.35 Hz, 4H, ArH). $^{13}$C NMR (62.9 MHz, DMSO-d$_6$, r.t.) δ 47.31 (CH$_3$), 59.97 (NCH$_2$), 126.66 (ArC), 157.45 (ArCq). Anal. Calc. for C$_{17}$H$_{17}$N$_5$ (in %) C, 70.10; H, 5.84; N, 24.05. Found C, 70.22; H, 6.05; N, 23.76. +CI MS: (m/z): 292 ([MH$^+$]).

Synthesis of N,N-bis(1-H-benzimidazol-2-ylmethyl)-N-(3-phenyl)propylamine (2c)

2c was synthesised by an analogous procedure to that described for 2a using o-phenylenediamine (4.32 g, 40 mmol) and N-(3-phenyl)propyliminodiacetic acid (5 g, 20 mmol) in ethyleneglycol (10 ml) at 190° C. Yield 6.9 g (84%). $^1$H NMR (400.13 MHz, CD$_3$OD, r.t.), δ 1.74 (quintet, 2H, CH$_2$), 2.45 (m, 4H, CH$_2$), 3.95 (s, 4H, NCH$_2$), 6.88 (d, 2H, ArH), 6.94-6.95 (dd, 3H, ArH), 7.21 (m, 4H, ArH), 7.56 (m, 4H, ArH), 12.33 (broad s, 1.5H, NH). $^{13}$C NMR (100.6 MHz, MeOH-d$_4$, r.t.), δ 29.49 (CH$_2$), 34.04 (CH$_2$), 53.95 (2 x NCH$_2$) 55.13 (NCH$_2$), 115.47 (broad, ArC), 123.59 (ArC), 126.58 (ArC), 129.09 (ArC), 129.24 (ArC), 142.95 (ArCq), 154.22 (ArCq from imidazole ring). Anal. Calc. for C$_{25}$H$_{25}$N$_5$ (in %) C, 75.54; H, 6.85; N, 17.62. Found C, 75.88; H, 6.55; N, 17.65. +CI MS: (m/z): 396 ([MH$^+$]), 280 ([M-CH$_2$Ph]$^+$).

N-(3-phenyl)propyliminodiacetic acid was synthesised by reacting potassium chloroacetate (14.05 g, 106 mmol) and N-propylphenylamine (7.13 g, 53 mmol), according to a literature procedure used for related diacetic acids.[2] Yield 8.02 g (60%). $^1$H NMR (250.13 MHz, DMSO-d$_6$, r.t.) δ 1.69 (quintet, 2H, CH$_2$), 2.57 (t, 2H, 2H, PhCH$_2$), 2.70 (t, 2H, NCH$_2$), 3.45 (s, 4H, 2×NCH$_2$), 7.15-7.29 (m, 5H, ArH). $^{13}$C NMR (62.9 MHz, DMSO-d$_6$, rt) δ 34.15 (CH$_2$), 37.76 (PhCH$_2$), 58.77 (NCH$_2$), 60.09 (2×NCH$_2$), 130.82 (ArC), 133.42 (ArC), 147.16 (ArCq), 177.40 (C(O)O). +CI MS: (m/e): 252 ([MH$^+$]).

Synthesis of N,N-bis(1H-benzimidazol-2-ylmethyl)-N-benzylamine (2d)

2d was synthesised by an analogous procedure to that described for 2a using o-phenylenediamine (2.41 g, 22.34 mmol) and benzyliminodiacetic acid (4.10 g, 11.17 mmol) in ethyleneglycol (10 ml) at 190° C. Yield 3.50 g (85%). $^1$H NMR (250.13 MHz, DMSO-d$_6$, r.t.), δ 3.74 (s, 2H, CH$_2$), 3.97 (s, 4H, NCH$_2$), 7.19-7.58 (overlapping and broad m, 13H, ArH). $^{13}$C NMR (100.6 MHz, MeOH-d$_4$, r.t.), δ 56.24 (NCH$_2$), 62.34 (CH$_2$), 102.03 (ArC), 126.94 (ArC), 132.37 (ArC), 133.38 (ArC), 134.23 (ArC), 142.70 (ArCq), 143.47 (ArCq), 157.41 (ArCq). +CI MS (m/z): 367 ([MH$^+$]).

Synthesis of N,N-bis(1H-benzimidazol-2-ylmethyl)-N-hexylamine (2e)

2e was synthesised by an analogous procedure to that described for 2a using o-phenylenediamine (16.34 g, 1154 mmol) and 3 (21 g, 77 mmol) without ethyleneglycol. Yield 21.5 g (77%). $^1$H NMR (250.13 MHz, DMSO-d$_6$, r.t.), δ 0.721 (t, 3H, CH$_3$), 1.01-1.2 (broad m, 6H, CH$_2$), 1.45 (quintet, 2H, CH$_2$), 3.96 (s, 4H, NCH$_2$), 7.13-7.15 (m, J$^3$=4 Hz, 4H, ArH), 7.53 (broad singlet, 4H, ArH), 12.29 (Broad s, 2H, NH). $^{13}$C NMR (100.6 MHz, DMSO-d$_6$, r.t.) δ 13.87 (CH$_3$), 22.02 (CH$_2$), 26.27 (2×CH$_2$), 31.04 (CH$_2$), 51.18 (2×NCH$_2$), 53.59 (NCH$_2$), 111.10 (ArC), 118.5 (ArC), 121.4 (ArC), 134.5 (ArC), 143.19 (ArCq), 152.71 (ArCq). Anal. Calc. for C$_{22}$H$_{27}$N$_5$ (in %) C, 73.10; H, 7.53; N, 19.37. Found C, 72.94; H, 7.39; N, 19.41. +CI MS: (m/z): 362 ([MH$^+$]).

Synthesis of N,N-bis(1H-benzimidazol-2-Ylmethyl)-N-isopropylamine (2f)

2f was synthesised by an analogous procedure to that described for 2a using o-phenylenediamine (17.61 g, 163 mmol) and 1f (18.8 g, 81 mmol). Yield 17.8 g (69%). $^1$H NMR (250.13 MHz, DMSO-d$_6$, r.t.), δ 1.04 (s, 3H, CH(CH$_3$)$_2$), 1.06 (s, 3H, CH(CH$_3$)$_2$), 2.88 (sept, J$^3$=6.41 Hz, 1H, CH(CH$_3$)$_2$), 3.92 (s, 4H, (CH$_2$)N), 7.14 (m, 4H, J$^3$=4 Hz, ArH), 7.53 (m, 4H, J$^3$=4 Hz, ArH), 12.29 (Broad s, 1.5H, NH). $^{13}$C NMR (100.6 MHz, DMSO-d$_6$, r.t.), δ 17.79 (CH$_3$), 48.37 (NCH$_2$), 50.62 (NCH), 114.75 (ArC), 121.44 (ArC), 168.63 (ArCq), 153.96 (ArCq). Anal. Calc. for C$_{19}$H$_{21}$N$_5$ (in %) C, 71.45; H, 6.63; N, 21.93. Found C, 71.59; H, 6.48; N, 21.90. +CI MS: (m/z): 320 ([MH$^+$]).

Synthesis of N,N-bis(1H-benzimidazol-2-ylmethyl)-N-cyclohexylamine (2w)

2c was synthesised by an analogous procedure to that described for 2a using o-phenylenediamine (11.66 g, 108 mmol) and 1 g (14.85 g, 54 mmol). Yield 17.06 g (88%). $^1$H NMR (400.13 MHz, DMSO-d$_6$, r.t.), δ 1.03-1.86 (overlapping and broad signals, Σ$_H$=10H, CH$_2$ from cyclohexyl), 3.46 (s, 1H, NCH), 4.01 (s, 4H, NCH$_2$), 7.13 (quartet, 4H, J$_{H-H}$=4 Hz, ArH), 7.54 (quartet, 4H, J$_{H-H}$=4 Hz, ArH). $^{13}$C NMR (100.6 MHz, DMSO-d$_6$, r.t.) δ 25.11 (CH$_2$), 25.44 (CH$_2$), 25.59 (CH$_2$), 28.22 (CH$_2$), 48.98 (NCH$_2$), 52.27 (NCH), 121.40 (ArC), 121.95 (ArC), 154.34 (ArCq). Anal. Calc. for C$_{22}$H$_{25}$N$_5$ (in %) C, 73.51; H, 7.01; N, 19.48. Found C, 73.56; H, 7.12; N, 19.56. +CI MS: (m/z): 360 ([MH$^+$]).

Synthesis of cis-2-[6-(1H-benzimidazol-2-yl)piperidin-2-yl]-1H-benzimidazole (2k)

2k was synthesised by an analogous procedure to that described for 2a using cis-2,6-piperidinedicarboxilate (1.4 g, 6.97 mmol) and o-phenylenediamine (1.51 g, 13.94). Yield 1.92 g (87%).

Product characterisation: $^1$H NMR (250.13 MHz, DMSO-d$_6$, r.t.), δ 1.60-1.74 (m, 3H, —CH), 2.01-2.10 (m, 3H, CH), 4.13-4.28 (dd, J$_{ea}$=11.16 Hz, J$_{ee}$=10.98 Hz, 2H, CB), 7.11-7.22 (m, 4H, ArCH), 7.51 (m, 4H, ArCH). $^{13}$C NMR (62.9 MHz, DMSO-d$_6$, r.t.) δ 23.87 (CH$_2$), 31.07 (CH$_2$), 31.42 (CH$_2$), 54.97 (C4), 109.90 (ArC), 118.69 (ArC), 121.31 (ArC), 121.86 (ArC), 155.84 (ArCq). +CI MS: (m/z): 318 ([M+H]$^+$). IR (KBr, cm$^{-1}$), υ 3394 (NH, s), υ 3054 (Ar—H, s), υ 1622-1535 (ArC=C, C=N, m), δ 1454-1430 (N—H, s), υ 1272 (CN, s), δ 739 (CH, s).

Dimethyl cis-2,6-piperidinedicarboxilate was obtained by catalytic hydrogenation using Pd/C following a literature procedure.[3]

Example 3

Synthesis of Neutral Complexes of Cr(III) Bearing a BIMA Ligand

CrCl$_3$(THF)$_3$ was reacted with the corresponding N-substituted BIMA in THF to afford 3a-3k (see below and Table 3) as green compounds in high yield (ca. 75-95%).

TABLE 3

| Compound | R$_1$ |
| --- | --- |
| 3a | H |
| 3b | Me |
| 3c | —(CH$_2$)$_3$Ph |
| 3d | Bn |
| 3e | Hexyl |
| 3f | $^i$Pr |
| 3g | Cyclohexyl |
| 3h | Phenyl |

Synthesis of N,N-bis(1H-benzimidazol-2-ylmethyl)amine chromium (III) chloride (3a)

Equimolar quantities of 2a (1 g, 3.61 mmol) and CrCl$_3$(THF)$_3$ (1.35 g, 3.61 mmol) were stirred in 20 ml of THF for 12 hours. The product was filtered, washed twice with THF (2×20 ml), once with diethyl ether (20 ml) and dried under vacuum. Yield 1.49 g, 95%. Anal. Calc. for C$_{16}$H$_{15}$Cl$_3$CrN$_5$ (in %): C, 44.11; H, 3.47; N, 16.07. Found C, 44.25; H, 3.74; N, 15.84. IR (KBr, cm$^{-1}$), υ 3202 (NH, s), υ 3120-3110 (Ar—H, s), υ 1622-1544 (ArC=C, C=N, m), δ 1497, 1477, 1456 (N—H, s), υ 1278 (CN, s), δ 742 (CH, s). UV-VIS (DMF, 298 K): λ$_{max}$/nm (ε$_{max}$/dm$^3$ mol$^{-1}$ cm$^{-1}$)=462 (138), 635 (93), 721 (shoulder). +FAB-MS: (m/z): 399 ([M-Cl]$^+$), 363 ([M-2Cl]). μ$_{eff}$=3.77 MB.

Synthesis of N,N-bis(1H-benzimidazol-2-ylmethyl)-N-methylamine chromium (III) chloride (3b)

3b was synthesised by an analogous procedure to that described for 3a using 2b (2 g, 6.87 mmol) and CrCl$_3$(THF)$_3$ (2.57 g, 6.87 mmol). Yield 2.87 g (93%). Anal. Calc. for C$_{17}$H$_{17}$Cl$_3$CrN$_5$ (in %): C, 45.40; H, 3.81; N, 15.57. Found C, 45.35; H, 3.76; N, 15.66. IR (KBr, cm$^{-1}$), υ 3221 (NH, s), υ 1622-1544 (ArC=C, C=N, m), δ 1455, 1477, 1497 (N—H, s), υ 1274 (CN, s), δ 753 (CH, s). UV-VIS (DMF, 298 K): λ$_{max}$/nm (ε$_{max}$/dm$^3$ mol$^{-1}$ cm$^{-1}$)=464 (156), 659 (75), 723 (shoulder). +FAB-MS: (m/z): 413 ([M-Cl]$^+$), 291 ([M-CrCl$_3$]). μ$_{eff}$=3.60 MB.

Synthesis of N,N-bis(1H-benzimidazol-2-ylmethyl)-N-(3-phenyl)propylamine chromium (III) chloride (3c)

3c was synthesised by an analogous procedure to that described for 3a using 2c (1 g, 2.53 mmol) and CrCl$_3$(THF)$_3$ (0.95 g, 2.53 mmol). Yield 1.00 g (71%). Anal. Calc. for C$_{25}$H$_{25}$Cl$_3$CrN$_5$ (in %): C, 54.21; H, 4.55; N, 12.64%. Found C, 54.32; H, 4.79; N, 12.50. IR (KBr, cm$^{-1}$), υ 3231 (NH, s), υ 1622 (ArC=C, C=N, m), δ 1454, 1477, 1498 (N—H, s, m), υ 1274 (CN, m), δ 752 (CH, s). +FAB-MS: (m/z): 517 ([M-Cl]), 482 ([M-2Cl]$^+$). μ$_{eff}$=3.87 MB.

Synthesis of N,N-bis(1H-benzimidazol-2-ylmethyl)-N-benzylamine chromium (III) chloride (3d)

3d was synthesised by an analogous procedure to that described for 3a using 2d (0.63 g, 1.73 mmol) and CrCl$_3$(THF)$_3$ (0.65 g, 1.73 mmol). Yield 0.79 g (88%). Anal. Calc. for C$_{23}$H$_{21}$Cl$_3$CrN$_5$ (in %): C, 52.54; H, 4.03; N, 13.32. Found C, 52.43; H, 4.03; N, 13.23. IR (KBr, cm$^{-1}$), υ 3255 (NH, s), υ 1617-1550 (ArC=C, C=N, m), δ 1454, 1477, 1496 (N—H, s, m), υ 1276 (CN, s), δ 749 (CH, s). UV-VIS (DMF, 298 K): λ$_{max}$/nm (ε$_{max}$/dm$^3$ mol$^{-1}$ cm$^{-1}$)=462 (162), 665 (75), 726 (shoulder). +FAB-MS: (m/z): 489 ([M-Cl]$^+$), 454 ([M-2Cl]), μ$_{eff}$=4.00 MB.

Synthesis of N,N-bis(1H-benzimidazol-2-ylmethyl)-N-hexylamine chromium (III) chloride (3e)

3b was synthesised by an analogous procedure to that described for 3a using 2e (1 g, 2.8 mmol) and $CrCl_3(THF)_3$ (1.05 g, 2.8 mmol). Yield 1.35 g, 93%. Anal. Calc. for $C_{22}H_{27}Cl_3CrN_5$ (in %): C, 50.83; H, 5.24; N, 13.47. Found C, 51.05; H, 5.30; N, 13.38. IR (KBr, cm$^{-1}$), υ 3502 (NH, m), υ 1621-1527 (ArC=C, C=N, m), δ 1498, 1477, 1431 (N—H, s), υ 1273 (CN, m), δ 751 (CH, s). +FAB-MS: (m/z): 483 ([M-Cl]$^+$), 448 ([M-2Cl]).

Synthesis of N,N-bis(1H-benzimidazol-2-ylmethyl)-N-isopropylamine chromium(III) chloride (3f)

3f was synthesised by an analogous procedure to that described for 3a using 2f (0.432 g, 1.35 mmol) and $CrCl_3(THF)_3$ (0.51 g, 1.35 mmol). Yield 1.20 g (84%). Anal. Calc. for $C_{19}H_{21}Cl_3CrN_5$ (in %): C, 47.77; H, 4.43; N, 14.66. Found C, 47.87; H, 4.35; N, 14.46. IR (KBr, cm$^{-1}$), υ 3227 (NH, s), υ 1623-1550 (ArC=C, C=N, m), δ 1455, 1478, 1497 (N—H, s, m), υ 1275 (CN, m), δ 753 (CH, s). UV-VIS (DMF, 298 K): $\lambda_{max}$/nm=459, 704, 731 (shoulder). +FAB-MS: (m/z): 441 ([M-Cl]$^+$), 406 ([M-2Cl]), 320 ([M-CrCl$_3$]). $\mu_{eff}$=3.46 MB.

Synthesis of N,N-bis(1H-benzimidazol-2-ylmethyl)-N-cyclohexylamine chromium (III) chloride (3g)

3g was synthesised by an analogous procedure to that described for 3a using 2g (1 g, 2.79 mmol) and $CrCl_3(THF)_3$ (1.04 g, 2.79 mmol). Yield 1.07 g (74%). Anal. Calc. for $C_{22}H_{25}Cl_3CrN_5$ (in %): C, 51.03; H, 4.87; N, 13.52. Found C, 50.93; H, 4.71; N, 13.64. IR (KBr, cm$^{-1}$), υ 3225 (NH, s), υ 1623-1540 (ArC=C, C=N, m), δ 1455, 1478, 1496 (N—H, s, m), υ 1276 (CN, m), δ 750 (CH, s). UV-VIS (DMF, 298 K): $\lambda_{max}$/nm ($\epsilon_{max}$/dm$^3$ mol$^{-1}$ cm$^{-1}$)=459 (160), 704 (65), 733 (shoulder). +FAB-MS: (m/z): 481 ([M-Cl]$^+$), 446 ([M-2Cl]), 360 ([M-CrCl$_3$]). $\mu_{eff}$=3.88 MB.

Synthesis of N,N-bis(1H-benzimidazol-2-ylmethyl)-N-phenylamine chromium (III) chloride (3h)

3h was synthesised by an analogous procedure to that described for 3a using N,N-bis(1H-benzimidazol-2-ylmethyl)-N-phenylamine (0.20 g, 0.56 mmol) and $CrCl_3(THF)_3$ (0.21 g, 0.56 mmol). Yield 0.23 g (87%). Anal. Calc. for $C_{22}H_{19}Cl_3CrN_5$ (in %): C, 51.63; H, 3.74; N, 13.68. Found C, 51.49; H, 4.95; N, 13.58. IR (KBr, cm$^{-1}$), υ 3224 (NH, s), υ 1637-1540 (ArC=C, C=N, m), δ 1454, 1477, 1498 (N—H, s, m), υ 1275 (CN, s), δ 748 (CH, s). $\lambda_{max}$/nm=484, 678, 707 (shoulder). +FAB-MS: (m/z): 475 ([M-Cl]$^+$), δ 440 ([M-2Cl]), 354 ([M-CrCl$_3$]$^+$). $\mu_{eff}$=3.95 MB.

Synthesis of 2-[(1H-benzimidazol-2-ylmethoxy)methyl]-1H-benzimidazole chromium (III) chloride (3i)

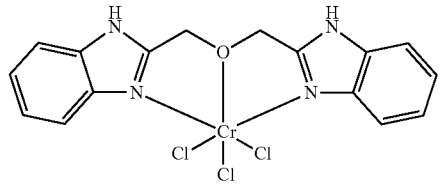

3i was synthesised by an analogous procedure to that described for 3a using 2-[(1H-benzimidazol-2-ylmethoxy)methyl]-1H-benzimidazole (0.7 g, 2.5 mmol) and $CrCl_3(THF)_3$ (0.94 g, 2.5 mmol) in 20 ml of THF. Yield 0.96 g, 85%. Anal. Calc. for $C_{16}H_{14}Cl_3CrN_4O$ (in %): C, 44.01; H, 3.23; N, 12.83. Found C, 44.19; H, 3.38; N, 12.70. IR (KBr, cm$^{-1}$), υ 3232 (NH, s), υ 1620-1540 (ArC=C, C=N, m), δ 1477-1454 (N—H, s), δ 749 (CH, s). +FAB-MS: (m/z): 400 ([M-Cl]$^+$) 365 ([M-2Cl]), 329 ([M-3Cl]).

Synthesis of 2-[6-(1H-benzimidazol-2-yl)pyridin-2-yl]-1H-benzimidazole chromium (III) chloride (3j)

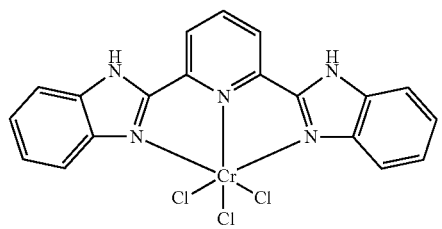

3j was synthesised according to a literature procedure.[4]

Synthesis of 2-[6-(1H-benzimidazol-2-yl)piperidin-2-yl]-1H-benzimidazole chromium (III) chloride (3k)

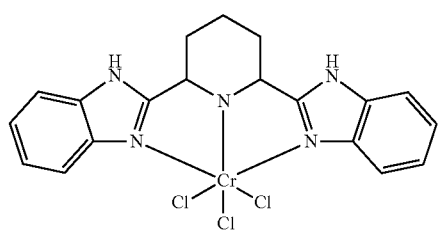

3k was synthesised by an analogous procedure to that described for 3a using 2k (0.30 g, 0.95 mmol) and $CrCl_3(THF)_3$ (0.38 g, 1.0 mmol). Yield 0.34 g (765%). Anal. Calc. for $C_{19}H_{19}Cl_3CrN_6$ (in %): C, 47.97; H, 4.03; N, 14.72. Found C, 47.89; H, 4.13; N, 14.62. +FAB-MS: (m/z): 439 ([M-Cl]$^+$), 403 ([M-2Cl]$^+$), 368 ([M-3Cl]$^+$). IR (KBr, cm$^{-1}$), υ 3398 (NH, s), υ 3152, 3112 (Ar—H, s), υ 1637-1540 (ArC=C, C=N, m), δ 1454 (N—H, s), υ 1278 (CN, s), δ 749 (CH, s).

Example 4

Synthesis of Cationic Cr(III) Complexes

Compounds 4a-4f were synthesised by reacting equimolar quantities of the corresponding neutral complexes (3a-3f) with $AgSbF_6$ (Scheme 4). This reaction proceeds with precipitation of AgCl, which is readily separated by filtration.

The chromium (III) acac complexes 5a-5f were obtained by treatment of the corresponding cationic THF-adduct complexes (4a-4f) with [Ag(acac)] (Scheme 4).

Synthesis of N,N-bis(1H-benzimidazol-2-ylmethyl)amine chromium (III) chloride hexafluoroantimonate tetrahydrofuran Adduct (4a)

Silver hexafluoroantimonate (0.24 g, 0.69 mmol) and complex 3a (0.3 g, 0.69 mmol) were stirred in THF (20 ml) at room temperature overnight. The solution was filtered, the solvent removed under reduced pressure, the product washed twice with diethyl ether (2×20 ml) and dried under vacuum. Yield 0.375 g, (77%). Anal. Calc. for $C_{20}H_{23}Cl_2CrF_6N_5OSb$ (in %): C, 33.92; H, 3.27; N, 9.80. Found C, 33.70; H, 3.26; N, 9.60. +FAB MS: (m/z): 399 ([M-THF]$^+$), 363 ([M-Cl, THF]$^+$), 281 ([M-Cr(THF)Cl$_2$]$^+$). −FAB-MS: (m/z): 235. $\mu_{eff}$=4.2 MB.

Synthesis of N,N-bis(1H-benzimidazol-2-ylmethyl)-N-methylamine chromium (III) chloride hexafluoroantimonate tetrahydrofuran Adduct (4b)

4b was synthesised by an analogous procedure to that described for 4a using silver hexafluoroantimonate (0.762 g, 2.22 mmol) and complex 3b (1 g, 2.22 mmol). Yield 1.09 g, 72%. Anal. Calc. for $C_{21}H_{25}Cl_2CrF_6N_5OSb$: C, 34.93; H, 3.49; N, 9.70. Found C, 34.89; H, 3.58; N, 9.58. IR (cm$^{-1}$), $\upsilon$ 3220 (NH, s), $\upsilon$ 3050 (Ar—H, s), $\upsilon$ 1597 (ArC═C, m), δ 1480, 1457 (N—H, m), $\upsilon$ 1277 (CN, m), δ 753 (CH, s), $\upsilon$ 664 (Sb—F, s). FAB(+) mass spectrum, m/z 413 [M$^+$-THF], 378 ([M$^+$-Cl, THF], 288 [M$^+$-Cr(THF)C$_2$]. FAB(−) mass spectrum, m/z 235 [M$^-$]. $\mu_{eff}$=3.77 MB.

TABLE 4

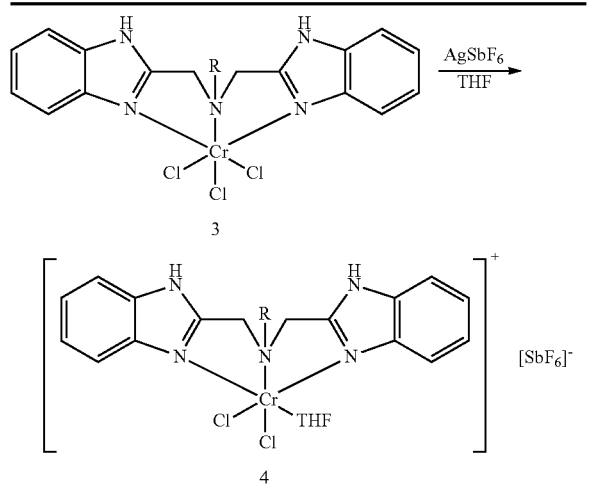

| Compound | R |
|---|---|
| 4a | H |
| 4b | Me |
| 4c | —(CH$_2$)$_3$Ph |
| 4d | Bn |
| 4e | Hexyl |
| 4f | $^i$Pr |

TABLE 5

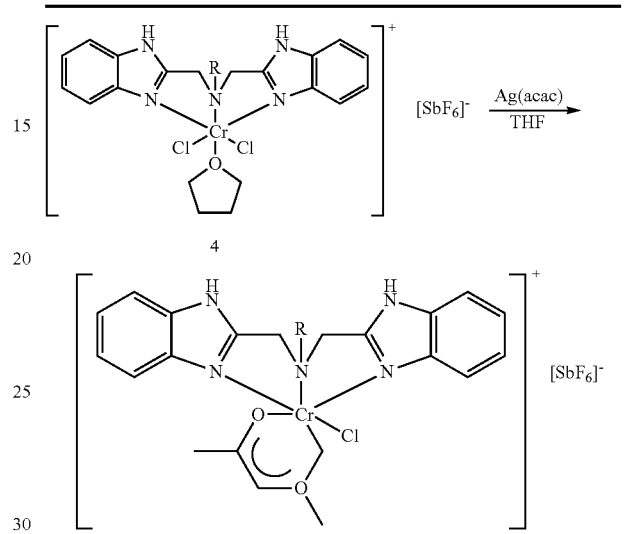

| Compound | R |
|---|---|
| 5a | H |
| 5b | Me |
| 5c | —(CH$_2$)$_3$Ph |
| 5d | Bn |
| 5e | Hexyl |
| 5f | $^i$Pr |

Synthesis of N,N-bis(1H-benzimidazol-2-ylmethyl)-N-propylphenylamine chromium (III) chloride hexafluoroantimonate tetrahydrofuran Adduct (4c)

4c was synthesised by an analogous procedure to that described for 4a using silver hexafluoroantimonate (0.25 g, 0.72 mmol) and complex 3c (0.40 g, 0.72 mmol). Yield 0.45 g, 75%. Anal. Calc. for $C_{29}H_{33}Cl_2CrF_6N_5OSb$: C, 42.16; H, 4.03; N, 8.48%. Found C, 41.94; H, 4.22; N, 8.62. UV-VIS (DMF, 298 K): $\lambda_{max}$/nm ($\epsilon_{max}$/dm$^3$ mol$^{-1}$ cm$^{-1}$)=437 (125), 621 (79), 719 (shoulder). +FAB-MS: (m/e): 517 ([M-THF]$^+$), 482 ([M-Cl, THF]$^+$). −FAB-MS: (m/z): 235 ([M]$^-$). $\mu_{eff}$=3.77 MB.

Synthesis of N,N-bis(1H-benzimidazol-2-ylmethyl)-N-benzylamine chromium (III) chloride hexafluoroantimonate tetrahydrofuran Adduct (4d)

4d was synthesised by an analogous procedure to that described for 4a using silver hexafluoroantimonate (0.20 g, 0.57 mmol) and complex 3d (0.30 g, 0.57 mmol). Yield 0.31 g, 68%. +FAB-MS: (m/e): 489 ([M]$^+$), 454 ([M-Cl]$^+$). −FAB-MS: (m/z): 235 ([M]$^-$).

Synthesis of N,N-bis(1H-benzimidazol-2-ylmethyl-N-hexylamine chromium (III) chloride hexafluoroantimonate tetrahydrofuran Adduct (4e)

4b was synthesised by an analogous procedure to that described for 4a using silver hexafluoroantimonate (0.661 g, 1.92 mmol) and complex 3e (1 g, 1.92 mmol). Yield 1.32 g, 87%. +FAB-MS: (m/e): 483 ([M]$^+$), 467 ([M-Me]$^+$), 449 ([M-Cl]), 361 ([M-Cr, Cl, THF). −FAB-MS: (m/z): 235 ([M]$^−$).

Synthesis of N,N-bis(1H-benzimidazol-2-ylmethyl)-N-amine chromium (III) chloride acetylacetonate hexafluoroantimonate (5a)

Silver acetylacetonate (0.077 g, 0.35 mmol) and complex 4a (0.24 g, 0.35 mmol) were dissolved in THF and stirred at room temperature for 48 hours. The solution was filtered and the solvent removed under reduced pressure. The resultant product was then washed with diethyl ether (2×20 ml) and dried under vacuum. Yield 0.19 g (79%). Anal. Calc. for $C_{21}H_{22}ClCrF_6N_5O_2Sb$ (in %): C, 31.85; H, 2.80; N, 8.84. Found C, 31.98; H, 2.91; N, 9.02. +FAB MS (m/z): 463 ([M]$^+$), 427 ([M-Cl]$^+$), 327 ([M-acac]$^+$). −FAB MS (m/z): 235 ([M]$^−$).

Synthesis of N,N-bis(1H-benzimidazol-2-ylmethyl)-N-methylamine chromium (III) chloride acetylacetonate hexafluoroantimonate (5b)

5b was synthesised by an analogous procedure to that described for 5a using silver acetylacetonate (0.11 g, 0.55 mmol) and complex 4b (0.40 g, 0.55 mmol). Yield 0.32 g, 82%. Anal. Calc. for $C_{22}H_{23}ClCrF_6N_5OSb$ (in %): C, 37.0; H, 3.23; N, 9.83. Found C, 36.68; H, 3.36; N, 9.57. +FAB MS (m/z): 477 ([M]$^+$). −FAB MS (m/z): 235 ([M]$^−$). $\mu_{eff}$=3.87 MB.

Synthesis of N,N-bis(1H-benzimidazol-2-ylmethyl)-N-(3-phenyl)propylamine chromium (III) chloride acetylacetonate hexafluoroantimonate (5c)

5c was synthesised by an analogous procedure to that described for 5a using silver acetylacetonate (0.046 g, 0.22 mmol) and complex 4c (0.18 g, 0.22 mmol). Yield 0.147 g (77%). Anal. Calc. for $C_{30}H_{32}ClCrF_6N_5O_2Sb$ (in %): C, 44.06; H, 3.94; N, 8.56. Found C, 43.98; H, 4.06; N, 8.42%. IR (KBr, cm$^{-1}$), υ 3374 (NH, s), ν 3062 (Ar—H, s), υ 1600-1520 (ArC=C+C=O, m), δ 1476 (N—H, m), υ 1281 (CN, m), δ 750 (CH, s), υ 660 (Sb—F, s). +FAB MS (m/z): 581 ([M]$^+$), 545 ([M-Cl]$^+$), 482 ([M-acac]$^+$). −FAB MS (m/z): 235 ([M]$^−$). $\mu_{eff}$=3.82 MB.

Synthesis of N,N-bis(1H-benzimidazol-2-ylmethyl)-N-benzylamine chromium (III) chloride acetylacetonate hexafluoroantimonate (5d)

5d was synthesised by an analogous procedure to that described for 5a using silver acetylacetonate (0.039 g, 0.19 mmol) and complex 4d (0.15 g, 0.19 mmol). Yield 0.12 g (77%). Anal. Calc. for $C_{28}H_{28}ClCrF_6N_5O_2Sb$ (in %): C, 42.58; H, 3.57; N, 8.87. Found C, 42.40; H, 3.58; N, 8.81. +FAB MS (m/z): 553 ([M]$^+$), 518 ([M-Cl]$^+$). −FAB MS (m/z): 235 ([M]$^−$).

Synthesis of N,N-bis(1H-benzimidazol-2-ylmethyl)-N-hexylamine chromium (III) chloride acetylacetonate hexafluoroantithonate (5e)

5e was synthesised by an analogous procedure to that described for 5a using silver acetylacetonate (0.065 g, 0.32 mmol) and complex 4e (0.25 g, 0.32 mmol). Yield 0.21 g (86%). Anal. Calc. for $C_{27}H_{34}ClCrF_6N_5O_2Sb$ (in %): C, 41.37; H, 4.37; N, 8.94. Found C, 41.53; H, 4.55; N, 8.80. +FAB MS (m/z): 547 ([M]$^+$), 531 ([M-Me]), 511 ([M-Cl]). −FAB MS (m/z): 235 ([M]).

Synthesis of N,N-bis(1H-benzimidazol-2-ylmethyl)-N-isopropylamine chromium (II) chloride acetylacetonate hexafluoroantimonate (5f)

5f was synthesised by an analogous procedure to that described for 5a using silver acetylacetonate (0.068 g, 0.33 mmol) and complex 4f (0.25 g, 0.33 mmol). Yield 0.20 g (82%). Anal. Calc. for $C_{24}H_{28}ClCrF_6N_5O_2Sb$ (in %): C, 38.86; H, 3.81; N, 9.44. Found C, 38.72; H, 3.79; N, 9.38. +FAB MS (m/z): 505 ([M]$^+$), 589 ([M-Me]), 469 ([M-Cl]$^+$). −FAB MS (m/z): 235 ([M]).

Comparative Example 5

Homo and Co-Polymerisation of 1,3-butadiene

5.2. Procedure 1: homo-polymerisation of 1,3-butadiene

A 200 ml glass reactor was dried and flushed with $N_2$, then charged with the chromium complex (1.1 μmol) and MAO (1.6 M in toluene). The mixture was stirred for 15 minutes followed by the addition of a solution of 1,3-butadiene monomer in toluene. The polymerisation reaction was carried out at room temperature by vigorous stirring of the mixture. For reactions carried out above room temperature, the glass reactor was submerged in an oil bath heated to the appropriate temperature. To terminate the polymerisation reaction, the unreacted butadiene was vented and methanol was added. The precipitated polymer was washed with methanol, separated by filtration and dried under vacuum at 60° C. for 24 h.

5.2.1. Polymerisation of 1,3-butadiene Using Complex 3a (Run 1, Table 6)

A glass Schlenk reactor supplied with a magnetic stirrer was charged with 0.5 mg of complex 3a (1.1 μmol) and 3.75 ml of a 1.6 M solution of MAO in toluene (6 mmol). After stirring the mixture for 15 minutes, a solution of 1,3-butadiene in toluene (20 ml, 1.88 g of 1,3-butadiene) was injected. The polymerisation reaction was performed under vigorous stirring at room temperature for 3 h. Afterwards the reaction was terminated and the resultant polymer isolated using the procedure described above (section 5.2). Polymer yield 0.96 g. Conversion of 1,3-butadiene into polybutadiene, 51%. The composition of the resultant polybutadiene was 97 mol % trans-1,4 and 3 mol % cis-1,4 (1,2-vinyl groups none detected) by FT-IR spectroscopy. The average molecular weight ($M_n$ and $M_w$), determined by GPC, were 93,960 g/mol and 233,510 g/mol, respectively. The polydispersity index (molecular weight distribution, $M_w/M_n$) was 2.49.

5.2.2. Polymerisation of 1,3-butadiene Using Complex 3b (Run 2, Table 6)

A glass Schlenk reactor supplied with a magnetic stirrer was charged with 0.5 mg of complex 3b (1.1 μmol) and 3.75 ml of a 1.6 M solution of MAO in toluene (6 mmol). After stirring the mixture for 15 minutes, a solution of 1,3-butadiene in toluene (20 ml, 1.70 g of 1,3-butadiene) was injected. The polymerisation reaction was performed under vigorous stirring at room temperature for 3 h. Afterwards the reaction was terminated and the resultant polymer isolated using the procedure described above (section 5.2). Polymer yield 1.70 g. Conversion level of 1,3-butadiene into polybutadiene, 100%. The composition of the resultant polybutadiene was 96.9 mol % trans-1,4; 2.5 mol % cis-1,4 and 0.5 mol % 1,2 by FT-IR spectroscopy. The average molecular weight ($M_n$ and $M_w$), determined by GPC, were 118,880 g/mol and 231,480 g/mol, respectively. The polydispersity index (molecular weight distribution, $M_w/M_n$) was 1.95.

Further 1,3-butadiene polymerisations, with complexes 3a-3k, 4a-4d and 5a, 5e-5f, were performed using the procedure described in section 5.2 (procedure 1); the results are given in Table 6.

5.2.3. Examples of 1,3-butadiene Polymerisation at Different Temperatures Using Complex 3b. (Procedure 1)

Polymerisation of 1,3-butadiene, using complex 3b and MAO, at temperatures higher than room temperature were carried out following the procedure described in section 5.2. The temperature was controlled by submerging the glass reactor in an oil bath heated at the desired temperature; the results are given in Table 7.

TABLE 6

Polymerisation of 1,3-butadiene with different BIMACr(III) based catalysts.

| Run[a] | Cat | Y[b] (%) | Microstructure[c] % (trans-1, 4/cis-1,4/1,2) | | | Mn[d] | Mw[d] | PDI[f] |
|---|---|---|---|---|---|---|---|---|
| 1 | 3a | 51 | 97 | 3 | ND[h] | 93,960 | 233,510 | 2.49 |
| 2 | 3b | 100 | >99 | ND | ND | 118,880 | 231,480 | 1.95 |
| 3 | 3c | 80 | 96 | 4 | 0 | 55,530 | 102,700 | 1.85 |
| 4 | 3d | 34 | 98 | <3 | <1 | 37,070 | 60,900 | 1.64 |
| 5 | 3e | 76 | 97 | <3 | <1 | 66,320 | 120,250 | 1.81 |
| 6 | 3f | 25 | 98 | <3 | <1 | 48,420 | 71,800 | 1.48 |
| 7 | 3g | 24 | 92 | 7 | 1 | | | |
| 8 | 3h | 48 | 98 | 2 | ND | 97,720 | 176,770 | 1.81 |
| 9 | 3i | 22 | 95 | 4 | 1 | | | |
| 10 | 3j | 17 | 98 | 2 | ND | 63,900 | 101,070 | 1.58 |
| 11 | 3k | 10 | 93 | 6 | 1 | 87,550 | 186,400 | 2.13 |
| 12 | 4a | 17 | 95 | 4 | 1 | 87,810 | 167,920 | 1.91 |
| 13[g] | 4b | 4 | 89 | 8 | 3 | 52,770 | 97,930 | 1.86 |
| 14 | 4c | 82 | 97 | 2 | 1 | 48,320 | 120,160 | 2.49 |
| 15 | 4d | 10 | >99 | 0 | <1 | 37,600 | 69,890 | 1.86 |
| 16 | 4e | 0 | | | | | | |
| 17 | 4f | 0 | | | | | | |
| 18[g] | 5a | 5 | 90 | 6 | 4 | 75,500 | 155,330 | 2.06 |
| 19[g] | 5e | 39 | 99 | <1 | <1 | | | |
| 20 | 5f | 2.4 | 96 | 4 | ND | 60,210 | 89,630 | 1.49 |

Notes on Table 6
[a]Polymerisation conditions: reaction time 3 h; butadiene load = 1.88 g. Catalyst, 1.1 μmol. Co-catalyst, MAO (1.6 M in toluene). Al/Cr = 6,000.
[b]Y = yield of polybutadiene = (g of PBD/gBD) * 100.
[c]Microstructure determined by FT-IR
[d]by GPC.
[f]PDI = $M_w/M_n$.
[g]Butadiene load = 1.7 g.
[h]ND = not detected.

TABLE 7

Polymerisation of 1,3-butadiene at different temperatures

| Run[a] | T (° C.) | Y[b] (%) | TOF[c] (h⁻¹) | Microstructure[d] % (trans-1, 4/cis-1,4/1,2) | | | $M_n$[e] | $M_w$[e] | PDI[f] |
|---|---|---|---|---|---|---|---|---|---|
| 13 | 30 | 62 | 27,980 | 93 | <7 | <1 | 73,270 | 120,860 | 1.65 |
| 14 | 40 | 81 | 36,560 | 97 | 3 | 0 | 77,020 | 158,790 | 2.06 |
| 15 | 50 | 89 | 40,160 | 92 | 7 | 1 | 91,400 | 196,420 | 2.15 |
| 16 | 60 | 81 | 36,560 | 90 | 9 | 1 | 97,740 | 190,700 | 1.95 |

Notes on Table 7
[a]Polymerisation conditions: reaction time 1 h; initial butadiene concentration of [BD]₀ = 1.9 mol/L. Catalyst: 3b/MAO (1 μmol). Co-catalyst, MAO (1.6 M in toluene). Al/Cr = 6,000.
[b]Y = yield of polybutadiene = (g of PBD/g BD) * 100.
[c]TOF = turnover frequency = mol $BD_t$ * (mol Cr)⁻¹ * h⁻¹, where $BD_t$ = mols converted butadiene at time t.
[d]Microstructure determined by FT-IR.
[e]by GPC.
[f]PDI = $M_w/M_n$.

5.3. Procedure 2: homo-polymerisation of 1,3-butadiene

1 L stainless steel reactor was evacuated under vacuum and flushed with nitrogen (99.99%) several times, then charged with a solution of toluene containing the 1,3-butadiene monomer, followed by the addition of the MAO. The reactor temperature was kept at 50° C. and the mixture was stirred for 40 minutes. Then a solution of the pre-activated catalysts in toluene was injected. The 1,3-butadiene polymerisation was carried out under mechanical stirring for 1.5 h. The reaction was terminated by venting the unreacted butadiene followed by the addition of methanol. The precipitated polymer was washed with methanol, separated by filtration and dried under vacuum at 60° C. for 24 h.

5.3.1. Example of 1,3-butadiene Polymerisation Following Procedure 2

A 1L stainless steel reactor was charged with a solution of 1,3-butadiene (19.2 g) in toluene (512.1 g) and MAO (20 ml of a 1.6M solution in toluene). The mixture was heated at 50° C. and stirred for 40 minutes, after which a solution of complex 1b (0.0045 g, 10 μmol) activated with MAO in toluene (1.6 M, 17.5 ml) was injected. After stirring for 1.5 h, the polymerisation was terminated and the resultant polymer isolated using the procedure described above. Polymer yield 17.1 g. Conversion of 1,3-butadiene into polybutadiene, 89%.

5.4. Co-polymerisation of 1,3-butadiene and ethylene Using Complex 3b. Procedure 3

A Fischer-Porter reactor was evacuated and flushed with nitrogen several times before it was filled with a solution of toluene (200 ml) containing 1,3-butadiene monomer (12.2 g) and 3.75 ml of MAO (1.6 M in toluene). The reactor was heated to 45° C. and the mixture stirred for 15 minutes after which a solution of complex 3b (0.0005 g, 1.1 μmol) activated with MAO in toluene (1.6 M, 3 ml) was injected. Ethylene (3 bar of total pressure) was then immediately supplied to the reactor. After 1.5 h, the ethylene supply was closed and the unreacted monomers were vented. The resultant polymer was isolated using the procedure described above. Polymer yield 69.1 g.

The resultant poly-ethylene-co-butadiene contained 10 mol % trans-1,4-butadiene by ¹³C NMR spectroscopy.

5.4.1. Co-polymerisation of 1,3-butadiene and ethylene Using Complex 3b. Procedure 4

A glass Schlenk reactor supplied with a magnetic stirrer was charged with 1 μmol of complex 1b and 3.8 ml of MAO 1.6 M. After stirring this mixture for 15 minutes, toluene was added to total volume of 50 ml. The Schlenk containing the catalytic mixture was then kept in an oil bath heated to 50° C. The nitrogen was evacuated and a mixture of ethylene/1,3-butadiene (2:1 mol/mol) was added. The pressure was kept constant at 1.5 bar during the polymerisation reaction. After stirring for 45 minutes, the reaction was terminated and the resultant polymer isolated as described above in section 5.2. Polymer yield 3.89 g.

The resultant poly-ethylene-co-butadiene contained 48 mol % 1,4-trans-butadiene by $^1$H and $^{13}$C NMR spectroscopy. The average molecular weight ($M_n$ and $M_w$), determined by GPC, were 5,180 g/mol and 15,570 g/mol, respectively. The polydispersity index (molecular weight distribution, $M_w/M_n$) was 3.01.

Example 6

Synthesis of a Co(II) Based Complex Bearing a BIMA Ligand (6a)

CoCl$_2$ was reacted with 2b in THF to afford 6a as a blue compound in high yield (85%). The general synthesis is outlined in the Scheme.

Scheme. Synthesis of the Co(II) complex.

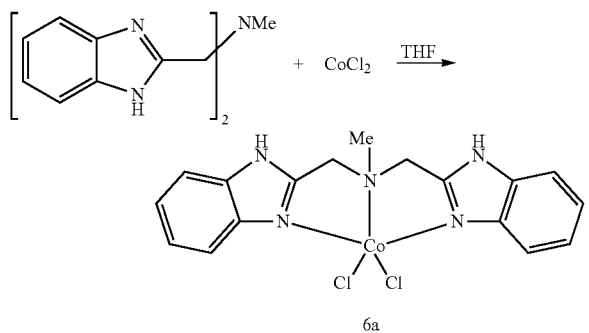

6a

Synthesis of N,N-bis(1H-benzimidazol-2-ylmethyl)-N-methylamine cobalt (II) chloride (6a)

Equimolar quantities of 2b (0.56 g, 1.93 mmol) and CoCl$_2$ (0.25 g, 1.93 mmol) were stirred in 40 ml of THF for 24 hours and then refluxed for 4 h. The product was filtered, washed three times with THF (3×20 ml), once with diethyl ether (20 ml) and dried under vacuum. Yield 0.69 g, (85%). IR (KBr, cm$^{-1}$), υ 3200 (NH, s), υ 1620-1540 (ArC=C, C=N, m), δ 1489-1454 (N—H, s), δ 764 (CH, s). +FAB-MS: (m/z): 385 ([M-Cl]$^+$), 420 ([M-H]$^+$), 769 ([2M-2Cl]$^{2+}$), 807 ([2M-Cl]$^+$).

Polymerisation of 1,3-Butadiene Using Complex 6a

A glass Schlenk reactor supplied with a magnetic stirrer was charged with 2.1 mg of complex 6a (5 μmol) and 1.88 ml of a 1.6 M solution of MAO in toluene (3 mmol). After stirring the mixture for 15 minutes, a solution of 1,3-butadiene in toluene (15 ml, 2.31 g of 1,3-butadiene) was injected. The polymerisation reaction was performed under vigorous stirring at room temperature for 1 h. The reaction was terminated by venting the unreacted butadiene followed by the addition of methanol. The precipitated polymer was washed with methanol, separated by filtration and dried under vacuum at 60° C. for 24 h. Polymer yield 1.2 g. Conversion of 1,3-butadiene into polybutadiene, 52%.

The composition of the resultant polybutadiene was 1 mol % trans-1,4 and 99 mol % cis-1,4 (1,2-vinyl: none detected) by $^{13}$C NMR spectroscopy.

Example 7

Synthesis of 1,4-trans/1,4-cis polybutadiene blend (Co/Cr≦10)

A glass Schlenk reactor supplied with a magnetic stirrer was charged with 4.2 mg of complex 6a (10 μmol), 0.5 mg of complex 3b (1 μmol) and 2.5 ml of a 1.6 M solution of MAO in toluene (4 mmol). After stirring the mixture for 15 minutes, a solution of 1,3-butadiene in toluene (30 ml, 4.62 g of 1,3-butadiene) was injected. The polymerisation reaction was performed under vigorous stirring at room temperature for 3 h. The reaction was terminated by venting the unreacted butadiene followed by the addition of methanol. The precipitated polymer was washed with methanol, separated by filtration and dried under vacuum at 60° C. for 24 h. Polymer yield 0.84 g. Conversion of 1,3-butadiene into polybutadiene, 18.2%.

The composition of the resultant polybutadiene blend was 52 mol % trans-1,4; 45 mol % cis-1,4 and 3 mol % 1,2 by FT-IR spectroscopy.

Synthesis of 1,4-trans/1,4-cis polybutadiene In-Reactor Blend (Co/Cr>10)

A Schlenk reactor supplied with a magnetic stirrer was charged with 4.2 mg of complex 6a (10 μmol) and 3.75 ml of a 1.6 M solution of MAO in toluene (6 mmol). The mixture was stirred for 5 minutes and then 0.4 ml of a solution of complex 3b (0.5 μmol/ml, 0.2 μmol) activated with MAO in toluene (1.6 M, 5 ml) was injected. After stirring the mixture for 5 minutes a solution of 1,3-butadiene in toluene (30 ml, 4.62 g of 1,3-butadiene) was added. The polymerisation reaction was performed under vigorous stirring at room temperature for 2.5 h. The reaction was terminated and the resultant polymer isolated using the procedure similar to that described above. Polymer yield 0.22 g. Conversion of 1,3-butadiene into polybutadiene, 5%.

The composition of the resultant polybutadiene blend was 73 mol % trans-1,4; 21 mol % cis-1,4 and 6 mol % 1,2 by FT-IR spectroscopy.

Different Co/Cr molar ratios were used to obtain polymer blends with different compositions; the results are given in Table 4.

TABLE 8

In-reactor polybutadiene blends obtained with catalysts 6a and 3b in different molar ratios.

| Run[a] | Co/Cr | Al/Co | Al/Cr | Yield[b] | Microstructure[c] % (trans-1, 4/cis-1,4/1,2) | | |
|---|---|---|---|---|---|---|---|
| 1 | 2 | 3500 | 7000 | 87.7 | 89 | 4 | 7 |
| 2 | 10 | 400 | 4000 | 18.2 | 52 | 45 | 3 |

TABLE 8-continued

In-reactor polybutadiene blends obtained with catalysts 6a and 3b in different molar ratios.

| Run[a] | Co/Cr | Al/Co | Al/Cr | Yield[b] | Microstructure[c] % (trans-1,4/cis-1,4/1,2) | | |
|---|---|---|---|---|---|---|---|
| 3 | 20 | 600 | 6000 | 10.6 | 73 | 21 | 6 |
| 4 | 50 | 600 | 6000 | 4.8 | 40 | 55 | 5 |

Notes on Table 8
[a] Co-catalyst, MAO (1.6 M in toluene).
[b] Y = yield of polybutadiene = (g of PBD/gBD) * 100.
[c] Microstructure determined by FT-IR.

REFERENCES

1. Schwarzenbach V. G., Anderegg G., Schneider W., Senn H., *Helv. Chim. Acta,* 1955, 38(132), 1147.
2. Bugella-Altamirano E., Choquesillo-Lazarte D., Gonzalez-Perez J. M., Sanchez-Moreno M. J., Marin-Sanchez R., Martin-Ramos J. D., Covelo B., Carvallo R., Castineiras A., Cutierrez-Niclos J., *Inorg. Chem. Acta,* 2002, 339, 160.
3. Chrystal E. J. T., Couper L., Robins D. J., *Tetrahedron,* 1995, 51(37), 1024).
4. Ceniceros-Góomez A. E., Barba-Berhens N., Quiroz-Castro M. E., Bernes S., North H., Castillo-Blum S. E., *Polyhedron,* 2000, 19, 1821

The invention claimed is:

1. A process for producing homopolymers or copolymers of conjugated dienes comprising contacting monomeric material comprising at least one conjugated diene with a catalyst system comprising two or more different transition metal compounds comprising (i) a first transition metal selected from the group consisting of complexes containing neutral, monoanionic or dianionic ligands wherein the ligands comprise at least one N donor atom and wherein the metal is selected from the group consisting of Cr, Mo and W; (ii) a second transition metal selected from the group consisting of complexes containing neutral, monoanionic or dianionic ligands wherein the ligands comprise at least one N donor atom and wherein the metal is selected from the group consisting of Fe, Co, and Ni; and optionally (iii) one or more activators.

2. A process as claimed in claim 1 wherein the ligands of the first transition metal complex or the second transition metal complex are monodentate, bidentate, tridentate or tetradentate.

3. A process as claimed in claim 1 wherein the ligands of the first transition metal complex or the second transition metal complex comprise at least one heteroatom selected from the group consisting of N, P, O and S.

4. A process as claimed in claim 1 wherein the transition metals comprise cobalt and chromium.

5. A process as claimed in claim 1 wherein the amount of each of the transition metal compounds is such that the concentration of any one of these compounds is >0.01 moles % based on total moles of transition metal compound employed as catalyst.

6. A process as claimed in claim 1 wherein the amount of each of the transition metal compounds is such that the concentration of any one of these compounds is at least 0.10 moles % based on total moles of transition metal compound employed as catalyst.

7. A process as claimed in claim 1 wherein at least one of the transition metal compounds is a metallocene.

8. A process as claimed in claim 1 wherein at least one of the transition metal compounds has the following Formula A

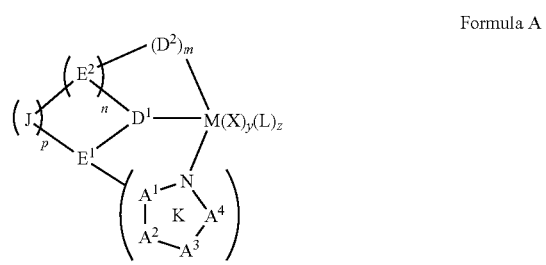

Formula A wherein in the five-membered heterocyclic group K, which can be saturated or unsaturated and unsubstituted or substituted by halide or hydrocarbyl groups, the atoms $A^1$ to $A^4$ comprise at least 2 carbon atoms and at least one atom selected from N, O, P and S, the remaining atom in said ring, if any, being selected from nitrogen and carbon; any 2 or more of $A^1$ to $A^4$ can form part of one or more further ring systems; M is a metal selected from the group consisting of Cr, Mo, W, Fe, Co and Ni; $E^1$ and $E^2$ are atoms or groups bearing single and or double bond connections and being independently selected from the group consisting of substituted carbon, unsubstituted carbon atom, (i) aliphatic hydrocarbyl, (ii) alicyclic hydrocarbyl, (iii) aromatic hydrocarbyl, (iv) alkyl substituted aromatic hydrocarbyl, (v) heterocyclic groups and (vi) heterosubstituted derivatives of said groups (i) to (v); J is a group comprising one or more carbon atoms and optionally one or more atoms selected from the group consisting of N, O, P and S each of which can be substituted or unsubstituted by halogen or hydrocarbyl groups; $D^1$ and $D^2$ are donor atoms or groups; X is an anionic group, L is a neutral donor group; m, n and p are independently 0 or 1; y and z are independently zero or integers such that the number of X and L groups satisfy the valency and oxidation state of the metal M.

9. A process as claimed in claim 5 wherein $D^2$ and K are identical imidazole containing groups.

10. A process as claimed in claim 5 wherein the imidazole-containing group K is a group selected from the group consisting of Formulae Ia, IIa, IIIa, IVa, Va and VIa:

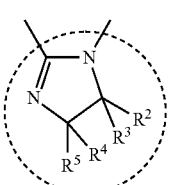

Ia

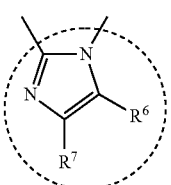

IIa

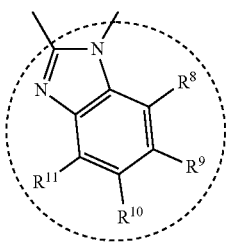

IIIa

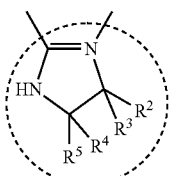

IVa

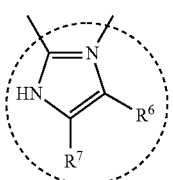

Va

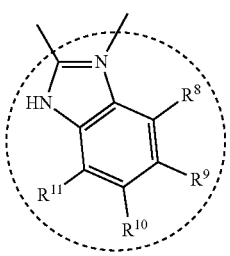

VIa wherein the groups $R^2$ to $R^{11}$ are independently hydrogen or a monovalent (i) aliphatic hydrocarbyl, (ii) alicyclic hydrocarbyl, (iii) aromatic hydrocarbyl, (iv) alkyl substituted aromatic hydrocarbyl (v) heterocyclic groups, (vi) heterosubstituted derivatives of said groups (i) to (v), and (vii) hydrocarbyl-substituted heteroatom groups.

11. A process as claimed in claim 5 wherein the transition metal compound is selected from the group of cobalt complexes consisting of:

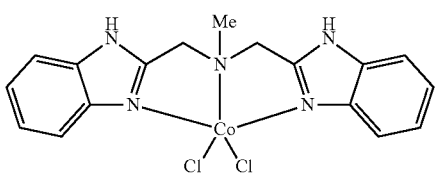

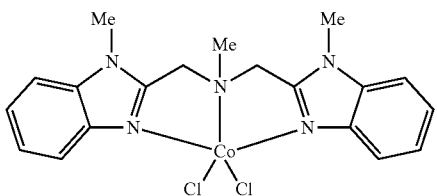

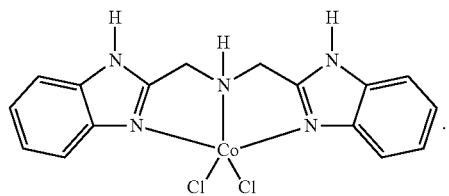

12. A process as claimed in claim 5 wherein the transition metal compound is selected from the group of chromium complexes consisting of:

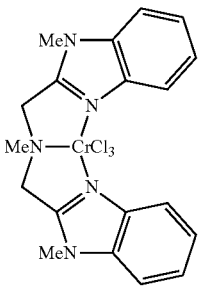 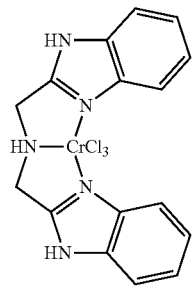

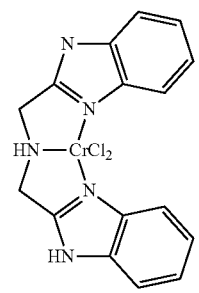 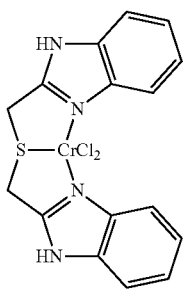

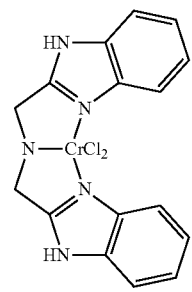 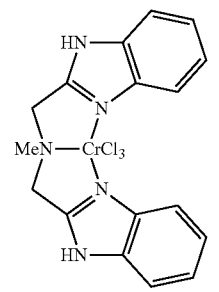

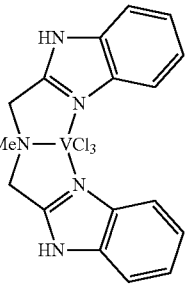 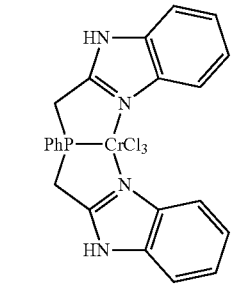

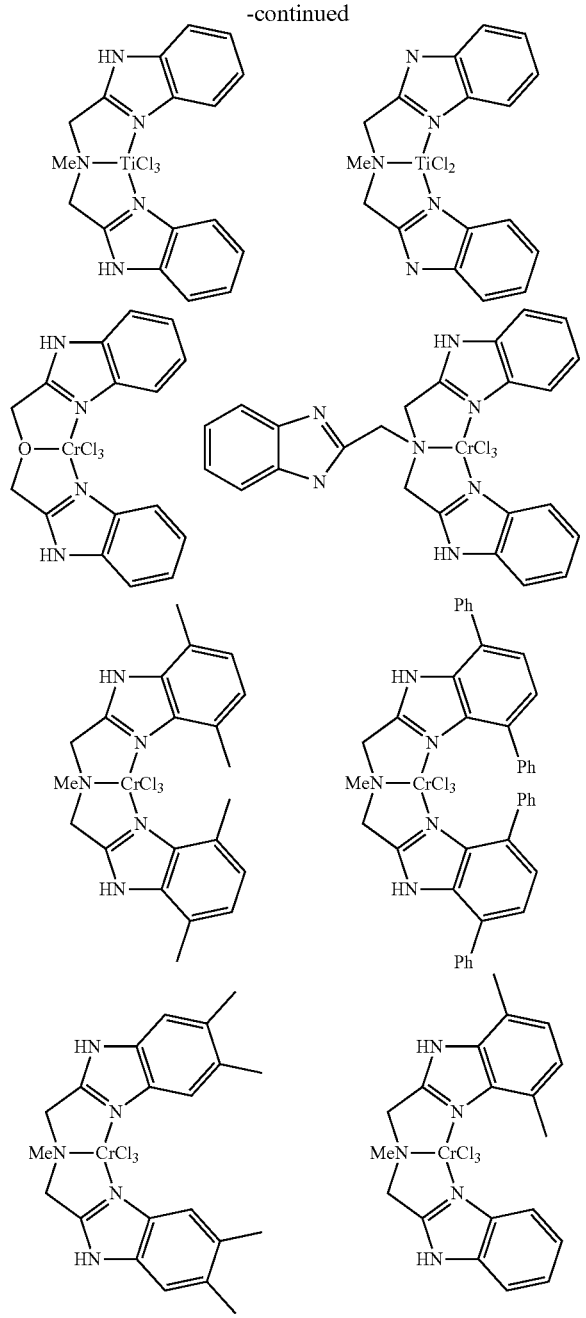
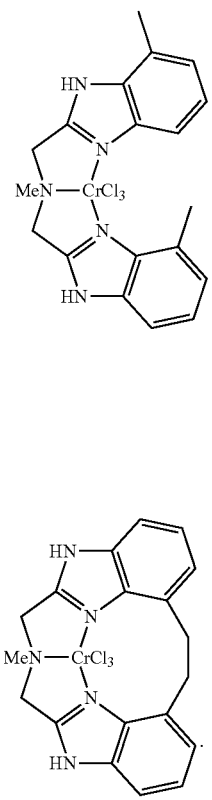

13. A process as claimed in claim 1 wherein at least one of the transition metal compounds is supported on a support material.

14. A process as claimed in claim 1 wherein the catalyst system comprises at least two transition metal compounds and an activator supported on the same support material.

15. A process as claimed in claim 13 wherein the support material is selected from the group consisting of silica, alumina, zirconia, magnesia, magnesium chloride, polymer and prepolymer.

\* \* \* \* \*